US008930814B2

(12) United States Patent
Nonaka

(10) Patent No.: US 8,930,814 B2
(45) Date of Patent: Jan. 6, 2015

(54) DIGITAL COMIC EDITOR, METHOD AND NON-TRANSITORY COMPUTER-READABLE MEDIUM

(71) Applicant: FUJIFILM Corporation, Tokyo (JP)

(72) Inventor: Shunichiro Nonaka, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 147 days.

(21) Appl. No.: 13/655,573

(22) Filed: Oct. 19, 2012

(65) Prior Publication Data

US 2013/0104016 A1 Apr. 25, 2013

(30) Foreign Application Priority Data

Oct. 21, 2011 (JP) .................................. 2011-232156

(51) Int. Cl.
*G06F 17/00* (2006.01)
*G06F 17/21* (2006.01)
*G06F 17/24* (2006.01)
*G06F 17/25* (2006.01)
*G06T 11/60* (2006.01)

(52) U.S. Cl.
CPC .............. *G06F 17/00* (2013.01); *G06F 17/212* (2013.01); *G06F 17/243* (2013.01); *G06F 17/24* (2013.01); *G06F 17/25* (2013.01); *G06T 11/60* (2013.01); *A63F 2300/5553* (2013.01); *A63F 2300/6623* (2013.01)
USPC ........... 715/705; 715/706; 715/716; 715/751; 715/788; 715/815; 715/800; 715/790; 382/118; 345/419

(58) Field of Classification Search
CPC ......... G06F 17/24; G06F 17/25; G06T 11/60; A63F 2300/5553; A63F 2300/6623
USPC ......... 715/255, 243–247, 253–254, 705, 716, 715/751, 788, 815, 800, 790, 706; 382/118; 345/419
See application file for complete search history.

(56) References Cited

U.S. PATENT DOCUMENTS

| 8,621,366 B1* | 12/2013 | Sampath ...................... 715/751 |
| 2002/0015050 A1* | 2/2002 | Kawai et al. .................. 345/635 |
| 2009/0237547 A1* | 9/2009 | Misawa et al. ........... 348/333.01 |

FOREIGN PATENT DOCUMENTS

| JP | 2010-129068 A | 6/2010 |
| JP | 2011-033850 A | 2/2011 |

OTHER PUBLICATIONS

Goldman et al.—"Schematic Storyboarding for Video Visualization and Editing" Published by ACM DL Digital Library Jun. 4, 2007 pp. 862-871.*

*Primary Examiner* — Quoc A Tran
(74) *Attorney, Agent, or Firm* — McGinn IP Law Group, PLLC

(57) ABSTRACT

The digital comic editor edits a piece of master data of a digital comic suitably for efficiently viewing a digital comic which has an image size larger than a screen size of a predetermined mobile terminal. The digital comic editor enables the master data of the digital comic to be appropriately edited. The master data includes a piece of image file having high resolution image of the entire page of the comic and an information file having described therein a piece of frame information including a piece of frame region information of the frame within the page. Particularly, the digital comic editor displays a frame boundary while superimposing the frame boundary on the image based on the frame region information included in the information file and displays a border F corresponding to the screen size of the predetermined mobile terminal on the image. The digital comic editor allows an editor to virtually drag and shift the position of the displayed frame boundary while referring to the border F; thereby the frame region information can be corrected to match with the screen size of the mobile terminal.

19 Claims, 27 Drawing Sheets

DIGITAL COMIC EDITOR, METHOD AND NON-TRANSITORY COMPUTER-READABLE MEDIUM

BACKGROUND OF THE INVENTION

1. Field of the Invention

The present invention relates to a digital comic editor, a method and a non-transitory computer-readable medium, and particularly relates to an art to digitize comic contents suitable to view the contents on a mobile terminal.

2. Description of the Related Art

Conventionally, there is known art in which a piece of image data (content) for viewing comic images is delivered via a network or provided to be obtained via a mobile recording medium (memory card) so as to be viewed on various electronic apparatuses such as mobile phone, mobile game machine and the like (Japanese Patent Application Laid-Open No. 2011-33850).

Japanese Patent Application Laid-Open No. 2011-33850 describes a content to be viewed. The content includes a single or a plurality of image data units of each page and a piece of anchor description data which includes a plurality of transition series of image region extraction reference coordinates (anchor coordinates). An image viewing device sequentially determines image region extraction reference coordinates based on the transition series of one of designated image region extraction reference coordinates. Images which are included in an extraction border prescribed by the image region extraction reference coordinates are sequentially determined and reproduced from the image data included in the single or plurality of image data units. At least a part of the reproduced images is displayed on a display device.

Also, Japanese Patent Application Laid-Open No. 2010-129068 describes an art in which borders of frames on an original comic are automatically determined, and an enlargement/reduction ratio, a scroll direction and a scroll method are automatically set in accordance with the size of the frames, and editing is performed manually. When performing manual editing, an image group editing device, which is an application for manual editing, is activated. A position of a border of a frame of the original comic is selected with a pointing device such as mouse while referring to a predetermined page on the read original comic and the border of the frame position is set.

SUMMARY OF THE INVENTION

However, Japanese Patent Application Laid-Open No. 2011-33850 does not describe the creation method by which the transition series of image region extraction reference coordinates (anchor coordinates) written in anchor description data are created.

According to the image group editing device described in Japanese Patent Application Laid-Open No. 2010-129068, borders of frames are automatically determined, and enlargement/reduction ratio, scroll direction and scroll method may be manually edited according to the size of the frames. However, Japanese Patent Application Laid-Open No. 2010-129068 does not describe manual editing assistance or the editing for efficiently viewing the comic content on a mobile terminal having a specific screen size.

The present invention has been proposed in view of the above circumstances. An object of the present invention is to provide a digital comic editor, a method and a non-transitory computer-readable medium capable of appropriately editing a master data of a digital comic. The master data including an image file of each page of the comic and an information file having described therein a piece of frame information including a piece of frame region information of the frames within the page. Particularly, the frame region information included the information file can be easily edited manually so as to be efficiently viewed with a screen size of a predetermined mobile terminal.

To achieve the above object, a digital comic editor according to an aspect of the present invention includes a data acquisition device configured to acquire a piece of master data of a digital comic, the master data including: an image file corresponding to each page of the comic, the image file having a high resolution image of the entire page, and an information file corresponding to each page or all pages of the comic, the information file having a piece of frame information including a piece of frame region information of each frame within the page; size information acquisition device configured to acquire a piece of size information representing a screen size of a predetermined mobile terminal which is used for viewing the digital comic; first display control device configured to control to display an image on a display device based on the image file in the master data acquired by the data acquisition device and to display a frame boundary while superimposing the same on the image based on the frame information included in the information file in the master data; a second display control device configured to display a border line representing the screen size while superimposing the border line on the image based on the size information acquired by the size information acquisition device; a shift indication device configured to cause the display position of the border line to shift on the image; an indication device configured to indicate a position on the image displayed on the display device; a frame boundary correction device configured to receive the indication input to correct the position of the frame boundary indicated by the indication device and corrects the frame boundary according to the received indication input; and an editing device configured to update a piece of frame region information included in the information file with a frame boundary corrected by the frame boundary correction device.

According to the one aspect of the present invention, the master data of a digital comic which includes an image file corresponding to each page of the comic, the image file having a high resolution image of the entire page, and an information file corresponding to each page or all pages of the comic, the information file having a piece of frame information including a piece of frame region information of each frame within the page can be appropriately edited. In particular, the position of the frame boundary which segments the frames within the page (including shape) can be corrected in accordance with the screen size of the predetermined mobile terminal. For example, when the size of a frame is larger than the screen size of the mobile terminal, it is required to shift (scroll) the image several times. However, when the size of the frame is slightly larger than the screen size, only a small shift amount is required. When there is little difference between the image which is viewed after a slight scroll and the image before the scroll, the scroll is not necessary for viewing the image; if it is made, it may prevent the visibility of the image. In such a case, by correcting (editing) the frame region information representing the position of the original frame boundary to match with the screen size of the mobile terminal, excessive scroll is eliminated when scrolling the image based on the frame region information, and the visibility of the image is enhanced.

The digital comic editor according to another aspect of the present invention preferably further includes: a frame addition device configured to add a new frame boundary to a position indicated by the indication device; and a frame deletion device configured to delete a frame boundary from a position indicated by the indication device, wherein the editing device updates a piece of frame region information included in the information file based on the frame boundary added by the frame addition device or the frame boundary deleted by the frame deletion device. The number of the frames can be increased by adding a new frame boundary to the original frame boundary or reduced by deleting a frame boundary. With this, the frame region information may be edited to match the screen size of the mobile terminal.

The digital comic editor according to yet another aspect of the present invention preferably further includes a third display control device configured to control, with respect to each frame segmented by the frame boundary, to display a piece of information representing the minimum number of display times necessary for displaying the entire image within the frame on the mobile terminal based on the image size within the frame and the screen size. With this, when displaying a frame on a predetermined mobile terminal, it is immediately understood how many times of shifting (scrolling) of the image make the entire frame be displayed.

In the digital comic editor according to yet another aspect of the present invention preferably, the information representing the number of display times is, for one display time, a marker having a square shape of side length "a"; and for the case of n-times in a vertical direction and m-times in the horizontal direction, a marker having a rectangular shape of na×ma in the vertical and horizontal directions. With this, it is understood at a glance how many times of the scrolling of the frame image in the vertical direction and the horizontal direction respectively are required for the entire frame to be displayed.

The digital comic editor according to yet another aspect of the present invention preferably further includes a frame detection device configured to detect a frame the horizontal or vertical size of which is larger than the size of the screen size in the horizontal or vertical direction and is smaller than a predetermined threshold value, the first display control device displays a periphery frame boundary of the frame detected by the frame detection device distinguishably from other frame boundaries. With this, it is understood if the frame boundary should be corrected or not.

The digital comic editor according to yet another aspect of the present invention preferably further includes: a selection device configured to select a preview display mode; and a fifth display control device configured to, when the preview display mode is selected by the selection device, pick up an image for one page having a size equivalent to the screen size of the mobile terminal from the image of the image file based on the frame information written in the information file and displays the picked up image on the display device while shifting the pick up position in order. With this, the image which is identical to the image viewed on the mobile terminal can be checked on the display device; thus it is checked if the position of the frame boundary should be corrected or not.

The digital comic editor according to yet another aspect of the present invention preferably further includes a fourth display control device configured to control to display the frame order representing read order of the frames while superimposing the frame order on the image of each frame based on a piece of frame order information, wherein the frame information includes the frame order information representing the read order of the frames within the page. With the frame order displayed on each frame by the fourth display control device, an editor can easily determine if the frame order is proper or not.

The digital comic editor according to yet another aspect of the present invention preferably further includes a fourth display control device configured to display a number representing frame order representing the read order of the frames on a rectangular marker which is displayed on each frame based on a piece of frame order information, wherein the frame information includes the frame order information representing the read order of the frames within the page.

The digital comic editor according to yet another aspect of the present invention preferably further includes a frame order correction device configured to receive an indication input to correct the frame order of the frame indicated by the indication device and corrects the frame order information responding to the received indication input. With the frame order displayed on each frame by the fourth display control device, the editor can easily determine if the frame order is proper or not. When the frame order information is not proper, the frame order information can be corrected.

In the digital comic editor according to yet another aspect of the present invention, the frame region information of the frame is a piece of coordinate data on each vertex on a polygonal frame boundary enclosing each frame; a piece of vector data representing the frame boundary or a piece of mask data representing a frame region of each frame.

The digital comic editor according to yet another aspect of the present invention preferably farther includes: an image acquisition device configured to acquire an image file having a high resolution image of the entire page; a frame region extraction device configured to analyze the image of the entire page acquired by the image acquisition device and automatically extracts the frame region of the frames within the page; an information file creation device configured to create an information file having described therein a piece of frame information including a piece of frame region information representing a frame region extracted by the frame region extraction device; and a master data creation device configured to create a piece of master data of the digital comic, the master data including: an image file of each page of the comic acquired by the image acquisition device, and an information file corresponding to each page or all pages of the comic created by the information file creation device, wherein the data acquisition device acquires a piece of master data created by the master data creation device.

When every pieces of frame information including frame region information of each frame are input manually, usually an enormous amount of work is required. However, by automatically creating the master data, the master data can be created efficiently.

The digital comic editor according to yet another aspect of the present invention preferably includes a data acquisition step acquiring a piece of master data of a digital comic, the master data including: an image file corresponding to each page of the comic, the image file having a high resolution image of the entire page, and an information file corresponding to each page or all pages of the comic, the information file having a piece of frame information including a piece of frame region information of each frame within the page; a size information acquisition step acquiring a piece of size information representing a screen size of a predetermined mobile terminal which is used for viewing the digital comic; a first display control step controlling to display an image on a display device based on the image file in the master data acquired in the data acquisition step and displaying a frame boundary while superimposing the same on the image based on the frame information included in the information file in the master data; a second display control step displaying a border line representing the screen size while superimposing the border line on the image based on the size information acquired by the size information acquisition step; a shift indication step causing the display position of the border line to shift on the image; an indication step indicating a position on the image displayed on the display device; a frame boundary correction step receiving the indication input to correct the position or the shape of the frame boundary indicated by the indication step and correcting the frame boundary according to the received indication input; and an editing step updating a piece of frame region information included in the information file with a frame boundary corrected by the frame boundary correction device.

A non-transitory computer-readable medium according to yet another aspect of the present invention is a non-transitory computer-readable medium storing a digital comic editing program causing a computer to achieve: a data acquisition step to acquire a piece of master data of a digital comic, the master data including: an image file corresponding to each page of the comic, the image file having a high resolution image of the entire page, and an information file corresponding to each page or all pages of the comic, the information file having a piece of frame information including a piece of frame region information of each frame within the page; a size information acquisition step to acquire a piece of size information representing a screen size of a predetermined mobile terminal which is used for viewing the digital comic; a first display control step to control to display an image on a display device based on the image file in the master data acquired in the data acquisition step and to display a frame boundary while superimposing the same on the image based on the frame information included in the information file in the master data; a second display control step to display a border line representing the screen size while superimposing the border line on the image based on the size information acquired by the size information acquisition step; a shift indication step to cause the display position of the border line to shift on the image; an indication step to indicate a position on the image displayed on the display device; a frame boundary correction step to receive the indication input to correct the position or the shape of the frame boundary indicated by the indication device and corrects the frame boundary according to the received indication input; and an editing step to update a piece of frame region information included in the information file with a frame boundary corrected by the frame boundary correction step.

According to the present invention, the master data of the digital comic which includes the image file of each page of the comic and the information file having described therein the frame information including the frame region information of each frame within the page can be appropriately edited. Particularly, since the screen size of the predetermined mobile terminal is displayed on the screen, the frame region information which is included in the information file can be easily edited manually while referring to the screen size so that the digital comic can be efficiently viewed on the mobile terminal.

DETAILED DESCRIPTION OF THE PREFERRED EMBODIMENTS

Embodiments of a digital comic editor, a method and a non-transitory computer-readable medium according to the invention will be described below referring to the appended drawings.

[Configuration of a Content Delivery System]

Figure 1:
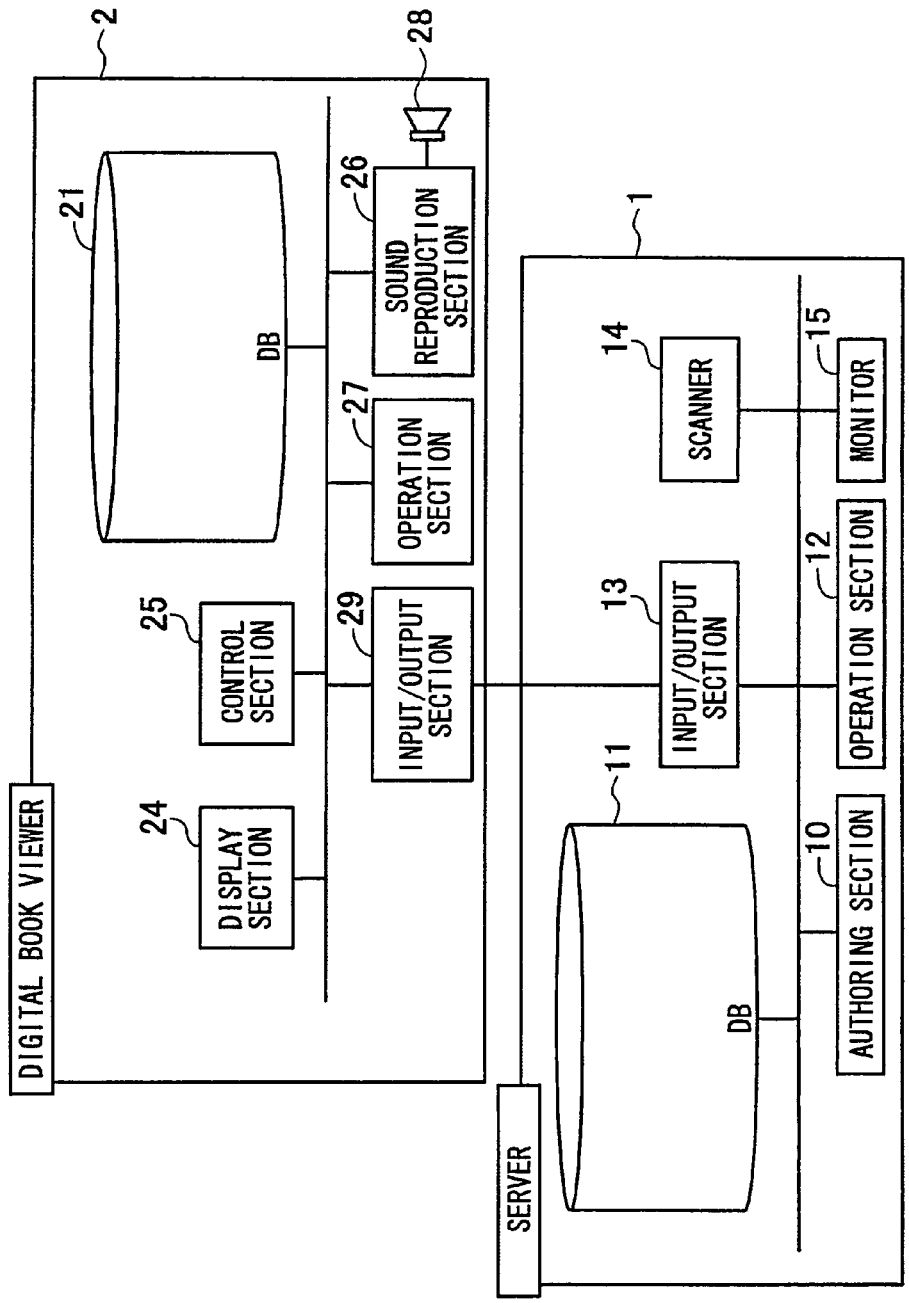
FIG. 1 illustrates a configuration of a content delivery system according to the invention.

FIG. 1 illustrates a configuration of a content delivery system according to a preferred embodiment of the invention. The system includes a server 1 and a digital book viewer 2. The server 1 is configured of a computer (information processor) including a processor (CPU), a storage, I/O circuits and the like.

The digital book viewer 2 is an information terminal including a display device capable of reproducing images, a communication device, a processor (CPU), a storage, I/O circuits, an operation device, a sound reproduction device capable of reproducing sounds and the like. For example, the digital book viewer 2 is constituted of a smartphone, a mobile phone, a PHS, a personal digital assistant (PDA), a tablet computer, or the like. Unspecified number of digital book viewers 2 may access to the server 1.

In particular, the server 1 includes an authoring section 10, a database (DB) 11, an operation section 12, an input/output section 13, a scanner 14, and a monitor 15.

The authoring section 10 includes an information processor such as CPU and a storage storing a digital comic editing program or the like to perform various information processing in accordance with the digital comic editing program. The DB 11 is constituted of a storage medium such as a hard disk and a memory and the like. The operation section 12 includes an operation device such as a keyboard, a mouse, a touch-pad and the like. The monitor 15 is a display device constituted of a display device such as an LCD.

The authoring section 10 analyzes a content image to create several pieces of collateral information such as page information, frame information, coordinates of speech bubble, region of interest (hereinafter, referred to as ROI) information and the like, and creates a piece of master data for digital book, in which these pieces of data are associated with each other. Also, the authoring section 10 creates a piece of data optimized for each digital book viewer 2 from the master data. Detailed description of the authoring section 10 will be given later.

The DB 11 accumulates content files for storing the content image associated with a page number and collateral information thereof in a predetermined file format. The content images are original contents which are the data digitalized using the scanner 14 or the like. The original contents include comics, newspapers, articles of magazines, office documents (presentation documents, etc), textbooks, reference books, which are set on the page basis. Also, each set of the content images is associated with its own page number.

The content images and additional information thereof are stored in an EPUB format. The content images may store a piece of additional information. The additional information may include an author of the content, title, total number of pages, volume number, episode number, copyright holder (publisher) and the like.

The content images are high resolution images (for example, 3000×5000 (dot) or 1500×2500 (dot)) and are prepared for each page.

The additional information appended to content images includes a piece of information input through the operation section 12, a piece of information on analysis result made by the authoring section 10 and a piece of information input via the input/output section 13, which are written in an information file (for example, XML file).

The digital book viewer 2 is constituted of a portable information terminal such as a smartphone or a tablet computer and includes a display device capable of reproducing images, a communication device, an operation detection device, a sound reproduction device, an information processor and the like.

In particular, the digital book viewer 2 includes a database (DB) 21, a display section 24, a content display control section 25, a sound reproduction section 26, an operation section 27, a speaker 28, and an input/output section 29.

The display section 24 is a display device including a display device such as an LCD. The operation section 27 is an operation detection device including a touch panel or the like. The operation section 27 is preferably laminated on the display section 24, and is capable of detecting various operations on the display section 24 such as single tap, double tap, swipe, long press or the like.

The sound reproduction section 26 is a circuit that converts sound-related information (information relevant to read sound and/or information relevant to accompanying sound) stored in the content file into sounds to outputs the same from the speaker 28.

The input/output section 29 is a device configured to inputs a content file output from the input/output section 13 of the server 1. Typically, the input/output section 13 and the input/output section 29 is a communication device, but it may be a write/read device for a computer readable storage medium.

The DB 21 stores information same as the DB 11. That is, when the digital book viewer 2 makes a request to the server 1 to transmit a digital book, the server 1 exports a content file from the DB 11 to the DB 21 via the input/output section 29, and the content file is stored in the DB 21. However, the information in the DB 11 and the information in the DB 21 may not be completely identical to each other. The DB 11 is a library that stores various kinds of content images, for example, content images of each volume of comics of different authors in order to meet the requests from various kinds of users. The DB 21 stores at least content files relevant to the contents that a user of the digital book viewer 2 desires to browse.

The content display control section 25 controls the display of contents on the display section 24.

[Operation of the Content Delivery System]

(A) Creation Processing of Master Data

Figure 2:
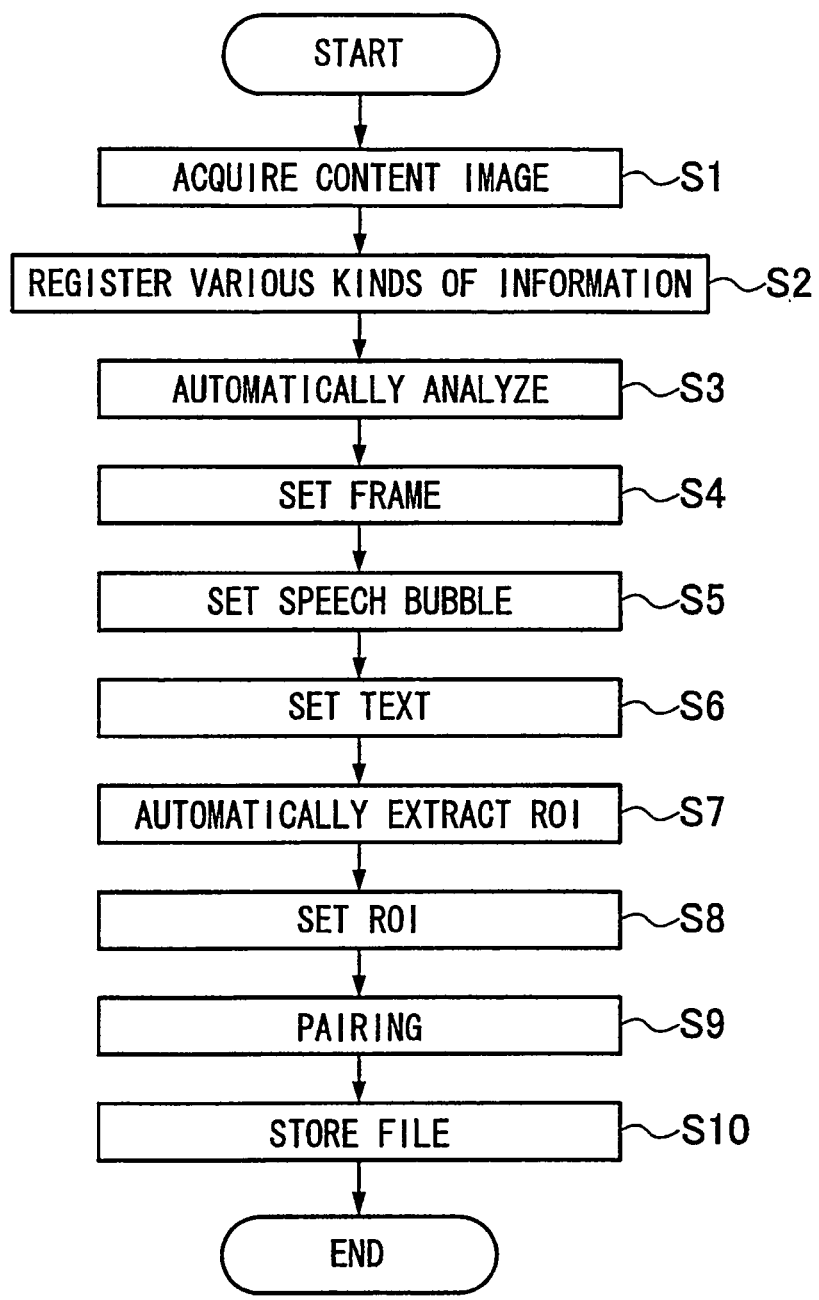
FIG. 2 is a flow chart of master data creation.

FIG. 2 is a flow chart illustrating the processing flow in which the authoring section 10 creates a piece of master data.

The authoring section 10 acquires a content image (step S1). The acquired image is stored in the DB 11. The server 1 acquires high resolution images of the entire page corresponding to the respective pages of the comic via a storage media or a network; or acquires images by reading the comic by the scanner 14. The authoring section 10 acquires content images acquired by the server 1 in the above manner. When the content image is already stored in the DB 11, the authoring section 10 may acquire the content image stored in the DB 11.

In step S1, the authoring section 10 causes the monitor 15 to display the content image acquired in step S1 on a registration screen which is a screen for registering various kinds of information. When the user (editor) inputs various kinds of information through the operation section 12 in accordance with the instruction on the registration screen, the authoring section 10 acquires and registers the information in the DB 11 while associating the content image (step S2). The authoring section 10 creates an information file and stores the various kinds of information in the information file. The authoring section 10 makes a connection between the content image and the information file with each other to create a piece of master data. The master data is temporarily stored in the DB 11.

The various kinds of information (page information) includes several pieces of information relevant to the content (content unique title ID, title name, author, publisher (holder of the right of publication), publication year, language and the like), a piece of information relevant to the page, page name, a piece of information of page ID. The information relevant to the page means a piece of information indicating whether the content image is a single page or a two-page spread, right-open/left-open, size of original content.

Figure 3:
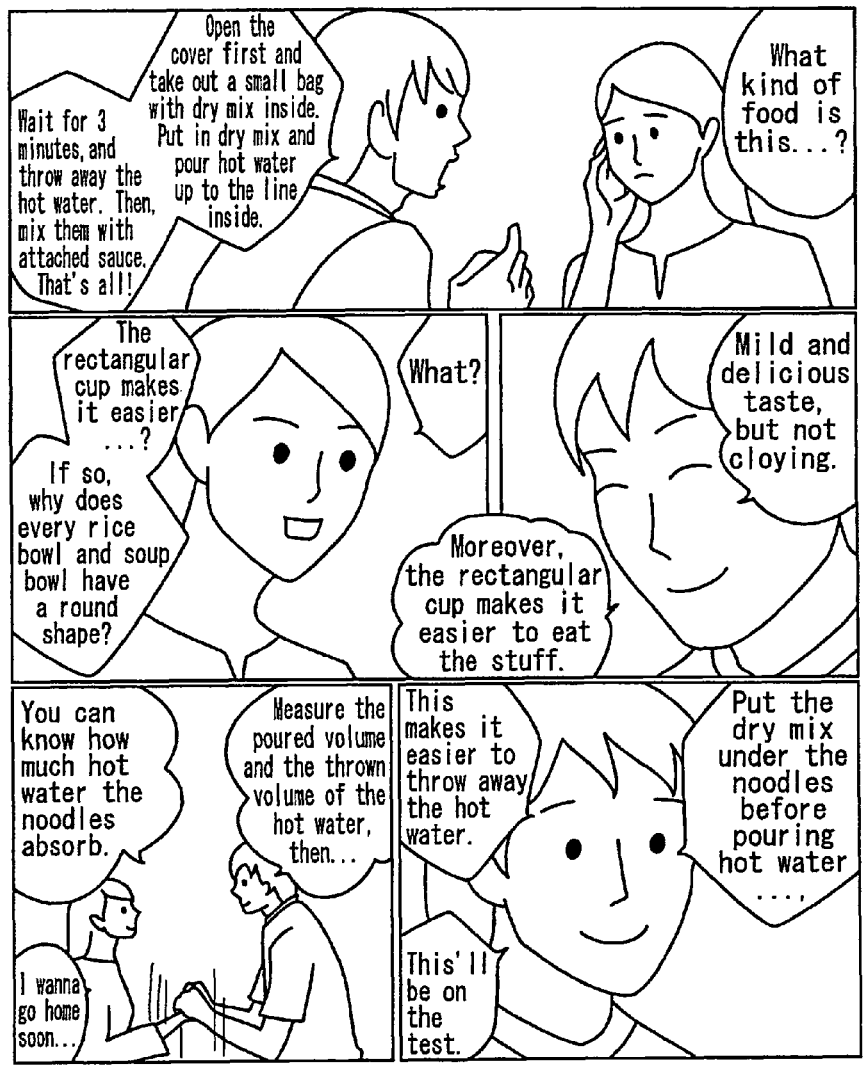
FIG. 3 illustrates an example of a content image.
Figure 4:
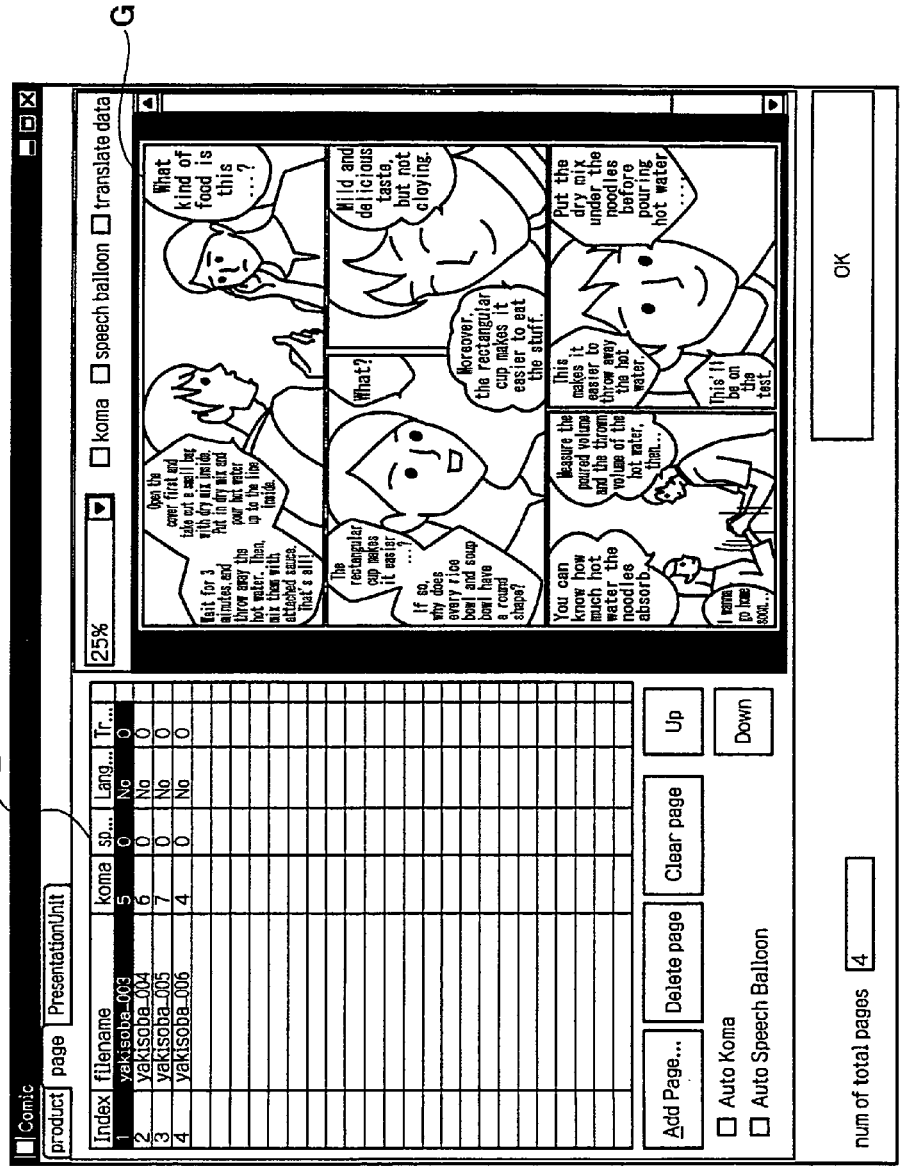
FIG. 4 illustrates an example of a monitor display.

When a content image shown in FIG. 3 is acquired in step S1, the authoring section 10 displays a registration screen shown in FIG. 4 on the monitor 15. On the registration screen, a content image G is displayed at the right hand; and a list L of the acquired content images is displayed at the left hand. "Index" is a file ID which is automatically given to the acquired content image. In the list L, plural pieces of information of the acquired content images are displayed in the order of file IDs. Before registration, "0" is displayed in the columns other than "Index".

When the editor makes an input operation on any column of "filename", "speaking", "Language" and "Translation" through the operation section 12, the authoring section 10 displays the input character information in the list L and stores the same in the DB 11. "filename" means a file name; "speaking" indicates existence of sound information; "Language" indicates a language of the character information included in the content image; "Translation" indicates existence of translation into other languages of the character information included in the content image. "koma" indicates number of the frames, at this point, "0" is displayed (automatically input later).

The authoring section 10 automatically analyzes the content image (step S3). The automatic analysis is executed when the editor checks (select) a check box of "Auto Koma" and/or "Auto Speech Balloon" and presses OK button A through the operation section 12 in the registration screen shown in FIG. 4. In this embodiment, a description is made assuming that "Auto Koma" and "Auto Speech Balloon" are selected.

When "Auto Koma" is selected, the authoring section 10 automatically detects frames based on information on the lines included in the content image. The information on the lines included in the content image is acquired by, for example, by recognizing a portion in which a region having a stronger contrast in the content image appears linearly as a line.

When "Auto Speech Balloon" is selected, the authoring section 10 extracts a text from the content image and determines a closed region enclosing the periphery of the text as a speech bubble region; thereby a speech bubble included in the content image is extracted. An optical character reader (OCR) included in the authoring section 10 extracts the text. The text read by the OCR is sorted based on the orientation of the characters. For example, when the words run vertically, the words are sorted from the top to the end of the line and from a line at the right toward the line at the left.

The frame detection and the speech bubble extraction may also be performed based on machine learning. For example, detection accuracy of the frame and outer edge of the speech bubble, a determination threshold of adequateness of the frame region other than rectangle and the speech bubble may be empirically set based on a learning sample comic.

The information file stores a piece of frame information on the frame, a piece of speech bubble information on the speech bubble, and a piece of text information on the text.

The frame information includes a piece of frame region information. The frame region information is a piece of information indicating a frame region which includes the number of the frames included in the page, coordinates of vertexes of each frame and a shape of each frame. The frame region information may be a piece of vector data indicating a frame boundary line or a piece of mask data indicating a frame region. The frame information further includes a piece of frame order information or the like relevant to the frame order (reproduction order) of each frame. An appropriate pattern of frame order is selected from some transition patterns of frame order such as, for example, from top right to bottom left, or from top left to bottom right of the page, and a shift direction (horizontal direction or vertical direction) or the like based on a piece of information on right-open/left-open page, a piece of information on content representing a language, a frame allocation detected from the frame region information and the like. Thus, frame order is automatically determined in accordance with the selected transition pattern.

The speech bubble information includes a piece of speech bubble region information. The speech bubble region information is a piece of information indicating regions where speech bubbles exist within a page unit (or frame unit), which includes a piece of position information (for example, coordinates) of plural points corresponding to a speech bubble shape on a line, a shape of the speech bubble (for example, vector information), position and direction of a start point of a speech bubble (vertex of speech bubble), and a size of the speech bubble. The speech bubble region information may be a piece of bitmap information (mask data) indicating a full region (range) of the speech bubble. The speech bubble region information may be represented by a specific position (center position) of the speech bubble and the size of the speech bubble. The speech bubble information further includes, a piece of information on a text included in the speech bubble, an attribute of the line of the speech bubble (dotted line, solid line etc), an ID information of a speaker of the speech bubble, and a frame to which the speech bubble belongs.

The text information includes a piece of text region information and a piece of information on the content of the text. The text region information includes a piece of position information of plural points corresponding to the text region on the line (for example, coordinates), a piece of vector information indicating outer periphery edge of the text region. The text region information may be a piece of bitmap information (mask data) indicating a text region (range). The information on the content of the text includes a piece of text (sentence) character attribute information specified by the OCR, number of lines, line spacing, character spacing, display switching method, language, vertical writing/horizontal writing, differentiation of reading direction and the like. The character attribute information includes a character size (the number of points etc) and character classification (font, highlighted character etc). The text information includes a dialog of a speaker in the speech bubble. The text information also includes a translation sentence and the language of various languages (translation sentences of 2 or more languages are available) corresponding to original dialog disposed in the speech bubble.

The authoring section 10 stores a piece of information in which the text and the speech bubble are associated with each other and a piece of information in which the speech bubble or text and the frame are associated with each other in an information file. Since the text is extracted during the extraction of the speech bubble, the text is associated with the speech bubble from which the text is extracted. By comparing the coordinates included in the speech bubble information with the coordinates included in the frame information, it is determined in which frame the speech bubble included. Thus, the speech bubble is associated with a frame in which the speech bubble is included. When no closed region is found around a text, it is a case when only the characters are included in the frame. Thus, the text is associated with a frame in which the text is included.

The authoring section 10 updates the master data by storing the frame information, the speech bubble information and the text information in the information file. When all of the processing of the step is made manually, enormous workload is required. By automatically performing the processing as described above, the master data is created efficiently.

The authoring section 10 displays the original content image and the detection result of the frame of the content image which is automatically analyzed in step S3 on the monitor 15 next to each other, receives a correction input of the frame detection result through the operation section 12, and performs frame setting based on the result (step S4).

Figure 5:
FIG. 5 illustrates a result of frames which are automatically detected from a content image.

The processing in step S4 is described in detail. FIG. 5 illustrates a frame detection result by the automatic analysis of a content image (file ID: 1, file name: yakisoba_003) shown in FIG. 3. Actually, the content image shown in FIG. 3 and the frame detection result shown in FIG. 5 are displayed on the monitor 15 next to each other. However, only the frame detection result shown in FIG. 5 may be displayed. The authoring section 10 displays the frame detection result based on the information file. The frame detection result is displayed with a thick dotted line with boundary line of each frame (hereinafter, referred to as frame boundary line) being overlapped with the contrast image; and in the center of each frame, a frame order indicating the reading order of the frame is displayed. With this, the editor can check the present frame region information (frame allocation) and frame order.

When a predetermined frame is selected by the editor, the authoring section 10 changes the color of the frame boundary of the frame to a color different from the color of other frame boundary line (for example, selected frame is red line; unselected frame is blue line), and starts to receive a correction input to a selected frame. With this, the editor can check the frame to be edited.

(1) Increasing Frames

In a state a frame is selected, when a certain position in the frame is selected, the authoring section 10 adds a frame boundary line adjacent to the selected position, and accompanying this, updates the frame order. In step S3, although a line is extracted and recognized, if the line cannot be recognized as a frame boundary line, an erroneous recognition is caused. When a certain position in the frame is selected, the authoring section 10 extracts a line adjacent to the position at which a selection instruction is input which is recognized as a line, but is not recognized as a frame boundary line, a new frame boundary line is added by recognizing the line as a frame boundary line.

Figure 6:
FIG. 6 illustrates a modification result of the frame detection result shown in FIG. 5.

In the frame detection result shown in FIG. 5, in the frame order 2 at the center of the content image, although actually two frames exist, they are recognizes as a single frame. Therefore, when the editor selects a point adjacent to lines A at the center of the frames through the operation section 12, the authoring section 10 divides the frame at the center of the content image into a frame of frame order 2 and a frame of frame order 3 as shown in FIG. 6.

Accompanying the increase of the frames, the authoring section 10 modifies the frame order. In this case, the frame order 3 of the frame in FIG. 5 is changed to 4, and the frame order 4 in FIG. 5 is changed to 5.

(2) Deleting Frame

Figure 7:
FIG. 7 illustrates a result of frames which are automatically detected from the content image.
Figure 8:
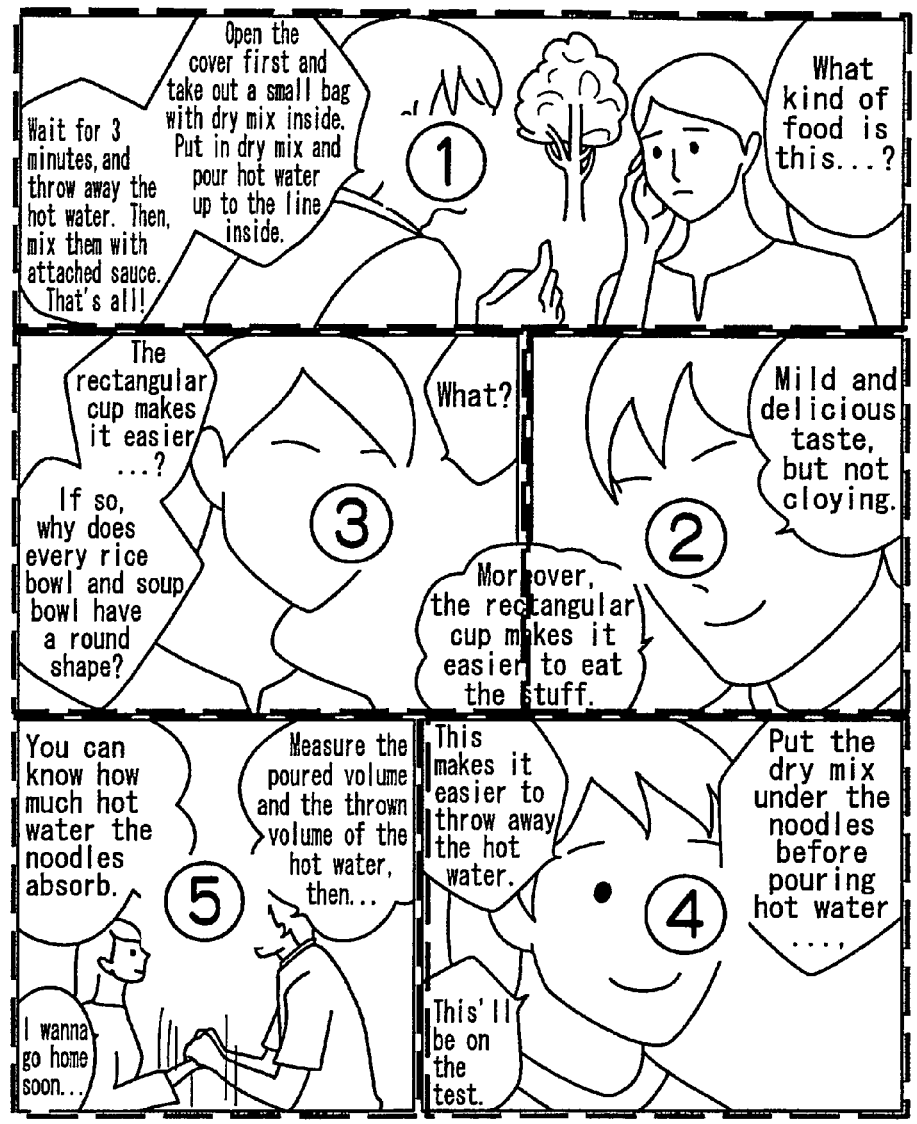
FIG. 8 illustrates a modification result of the frame detection result shown in FIG. 7.

In an example shown in FIG. 7, as a result of false recognition that a trunk of a tree B is a line dividing the frame, although the upper portion of the content image is divided into two, actually, the upper frame of the content image is a single frame. An image shown in FIG. 7 is displayed on the monitor 15, in a state that the frame with frame order 1 or the frame with frame order 2 is selected, when the editor selects the frame boundary line between the frame with frame order 1 and the frame with frame order 2 through the operation section 12, the authoring section 10 deletes the frame boundary line between the frame with frame order 1 and the frame with frame order 2 in FIG. 7, and modifies the upper frames of the content image into a single frame with frame order 1 as shown in FIG. 8.

Accompanying the deletion of the frame, the authoring section 10 modifies the frame order. In this case, the frame order 3 in FIG. 7 is changed to 2; the frame order 4 is changed to 3; and the frame order 6 is changed to 4.

When adding or deleting the frame boundary line, the added frame boundary line and the frame boundary line to be deleted may be displayed to distinguishable from other frame boundary lines. With this, the editor can recognize which frame boundary line is added and which frame boundary line is deleted.

(3) Modification of Frame Boundary Line

When selected frame is double-clicked, the authoring section 10 receives correction input of the number of vertexes and coordinates. With this, shape and size of frame can be modified.

Figure 9:
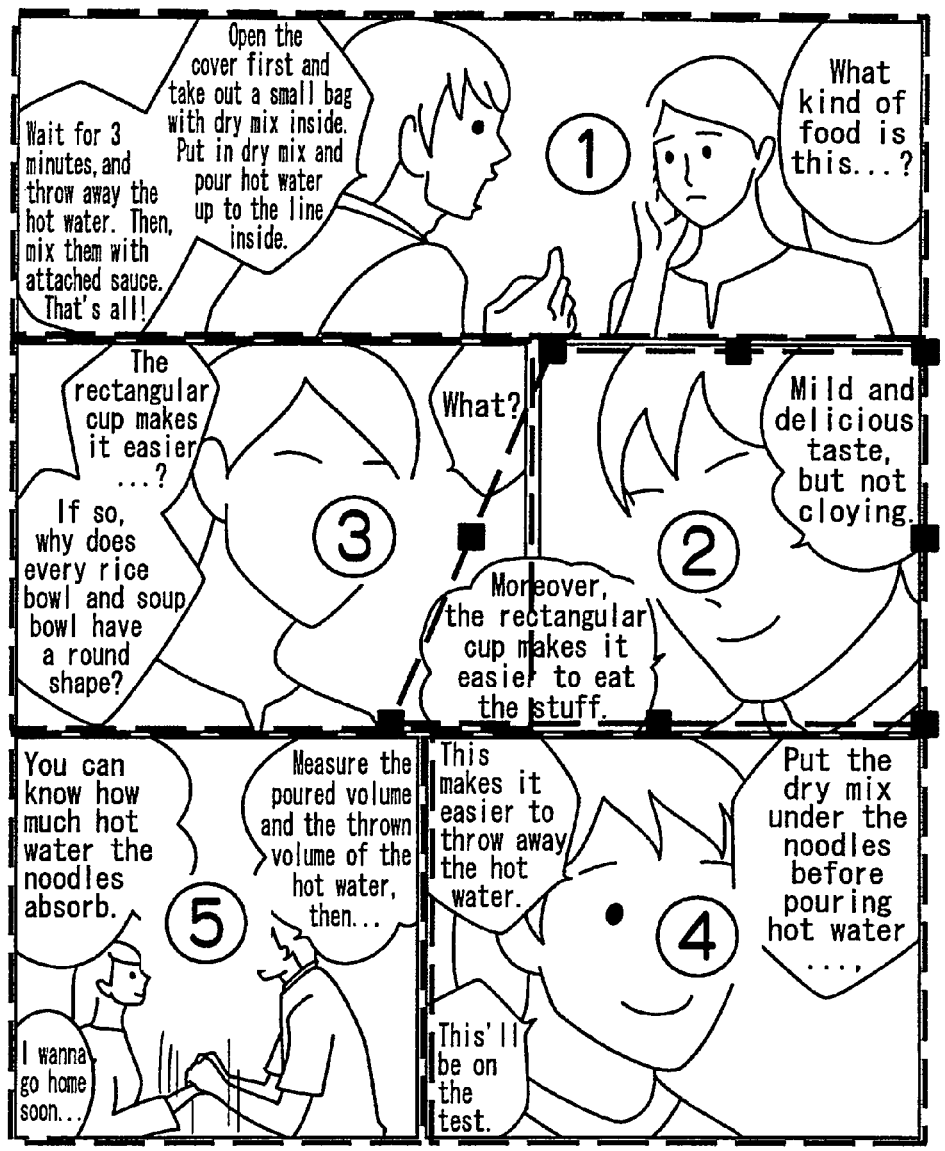
FIG. 9 illustrates a modification of a frame boundary line.

When the selected frame is double-clicked, a modification screen of the frame boundary line is displayed as shown in FIG. 9. A frame is represented with a polygonal shape having three or more vertexes, and a frame boundary line is represented with a line connecting three or more vertexes. In FIG. 9, since the frame has a square shape, total eight vertexes of the vertexes of the square shape and at rough center of the edges are displayed.

When the editor inputs an instruction by double-clicking at a desired position on the frame boundary line through the operation section 12, a vertex is added to the position. Also, when the editor inputs an instruction by double-clicking on a desired vertex through the operation section 12, the vertex is deleted.

When the editor drags a desired vertex through the operation section 12, the vertex is shifted as shown in FIG. 9, the shape of the frame boundary line is modified. By repeating this operation, the shape and the size of the frame boundary line can be changed.

(4) Modification of Frame Order

When the user double-clicks on a number indicating the frame order through the operation section 12, the authoring section 10 receives the modification of the frame order, and modifies the frame order with the number input through the operation section 12. With this, when the automatically analyzed frame order is not correct, the frame order is modified.

When frame setting is made, the authoring section 10 modifies the frame information of the information file accordingly. When an instruction to display the registration screen is made after frame setting, the authoring section 10, displays the input number of the frame in a column of "koma" of the list L on the monitor 15. When the result shown in FIG. 6 is set, 5 is input in the "koma" with file ID of 1 as shown in FIG. 4.

When frame setting is made (in step S4), the authoring section 10 displays the original content image and the extraction result of the speech bubble of the content image which is automatically analyzed in step S3 on the monitor 15 next to each other, receives the correction input of the extraction result of the speech bubble through the operation section 12 and sets the speech bubble based on the result (step S5).

Figure 10:
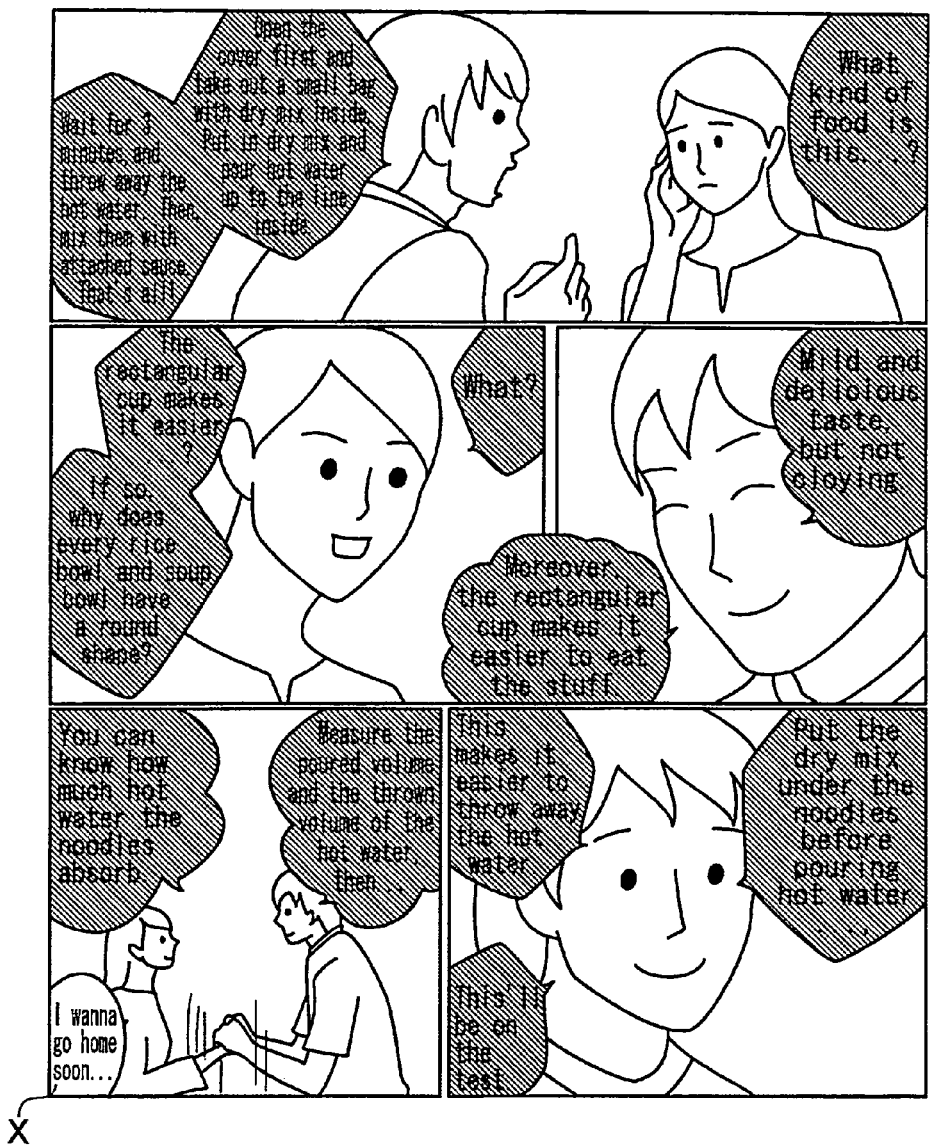
FIG. 10 illustrates a result of speech bubbles which are automatically extracted from the content image.

The processing in step S5 is described in detail. FIG. 10 is an extraction result of speech bubbles in the content image (file ID: 1, file name: yakisoba_003) shown in FIG. 3 obtained by automatic analysis. Actually, the content image shown in FIG. 3 and the speech bubble extraction result shown in FIG. 9 are displayed on the monitor 15 next to each other. However, only the speech bubble extraction result shown in FIG. 9 may be displayed. The authoring section 10 displays the speech bubble extraction result based on the information file. The authoring section 10 displays a covered over image of the extracted speech bubble on the monitor 15 so that the extracted speech bubble can be distinguished from other region. In FIG. 9, as the image indicating the speech bubble regions, an image in which the extracted speech bubbles are covered over by hatching is shown. An image in which the outer periphery edges of the speech bubbles are thickly drawn may be displayed as an image indicating the speech bubble regions.

(1) Addition of Speech Bubble

Figure 11:
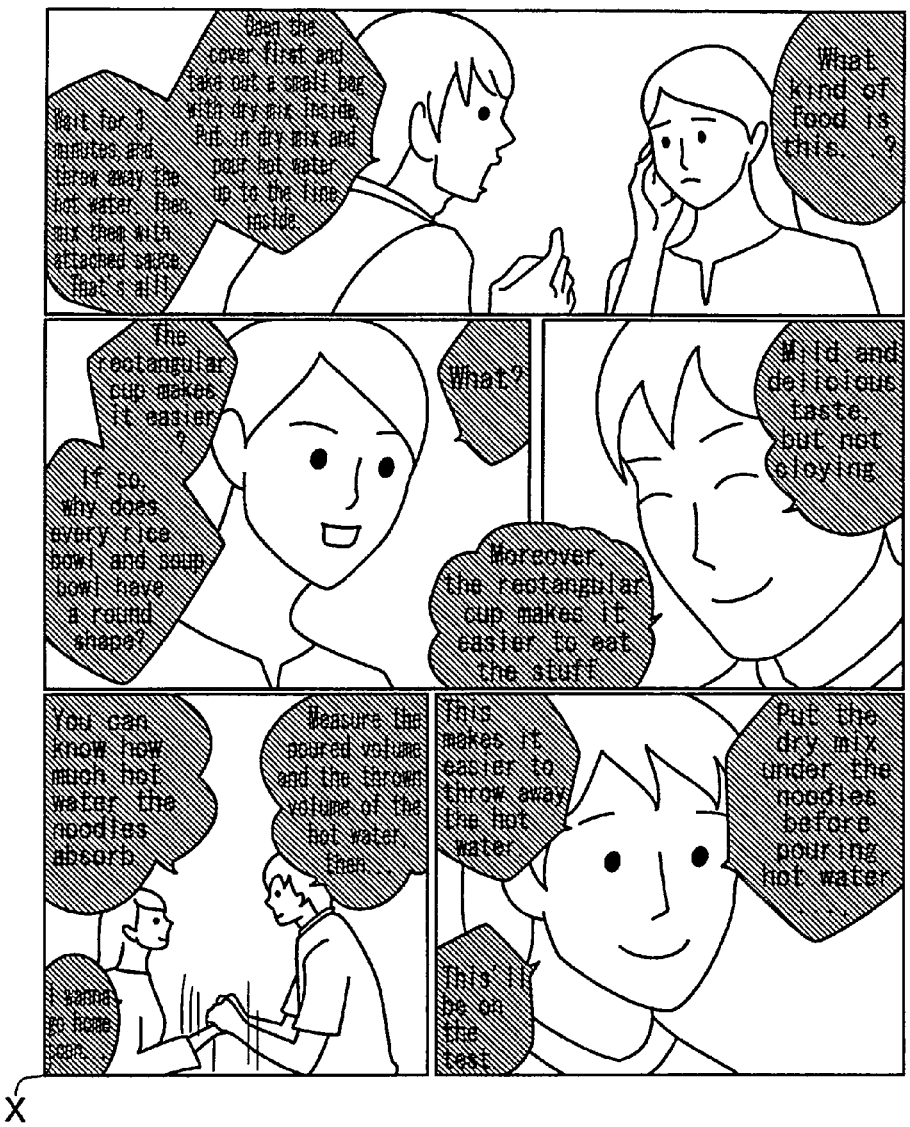
FIG. 11 illustrates a modification of the speech bubble extraction result shown in FIG. 10.

In the extraction result shown in FIG. 10, since a part of the boundary line of a speech bubble X at the bottom left is broken, it is not detected automatically. The editor connects the portion where boundary line is broken through the operation section 12 to form a closed region. After that, when the editor selects the closed region through the operation section 12 and indicates the recognition, the authoring section 10 automatically recognizes the selected closed region as a speech bubble. As a result, hatching is also displayed on the speech bubble X as shown in FIG. 11, and is set as a speech bubble same as the other speech bubbles.

(2) Deleting Speech Bubble

Figure 12:
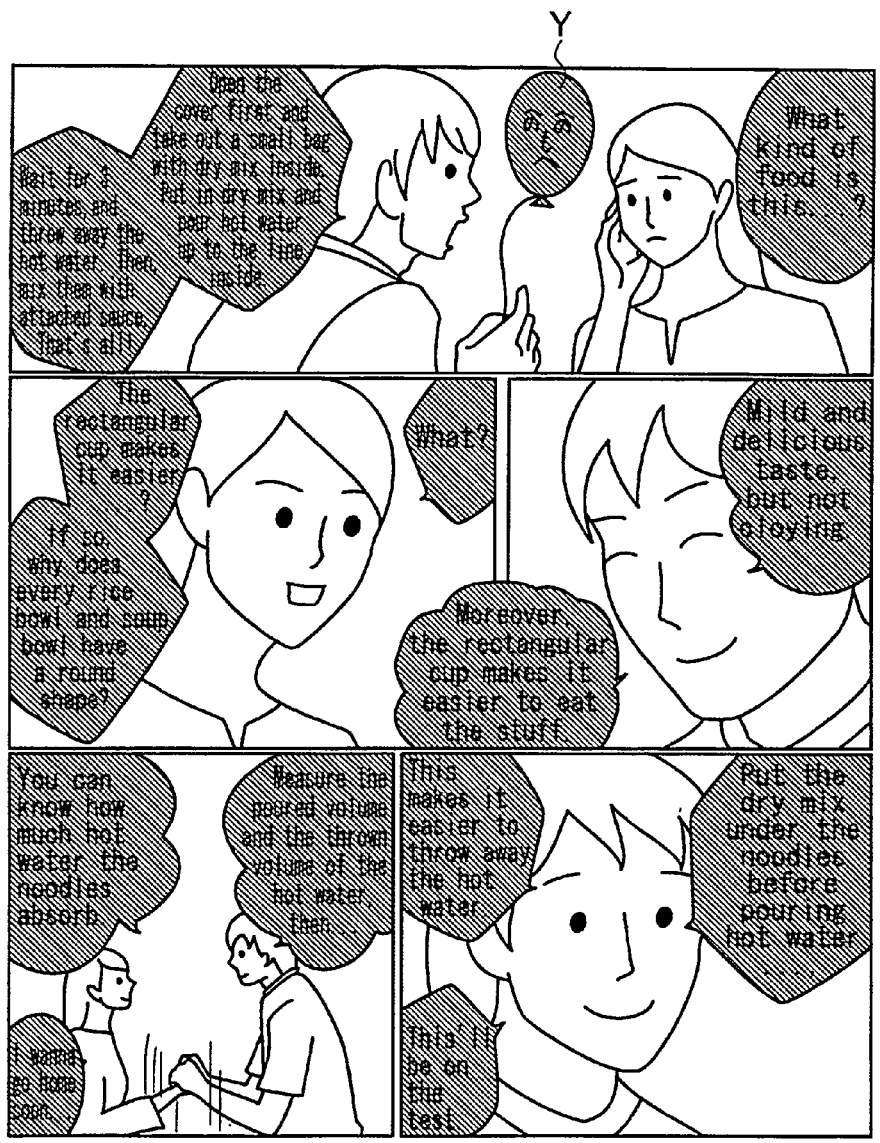
FIG. 12 illustrates a result of the speech bubbles which are automatically extracted from the content image.
Figure 13:
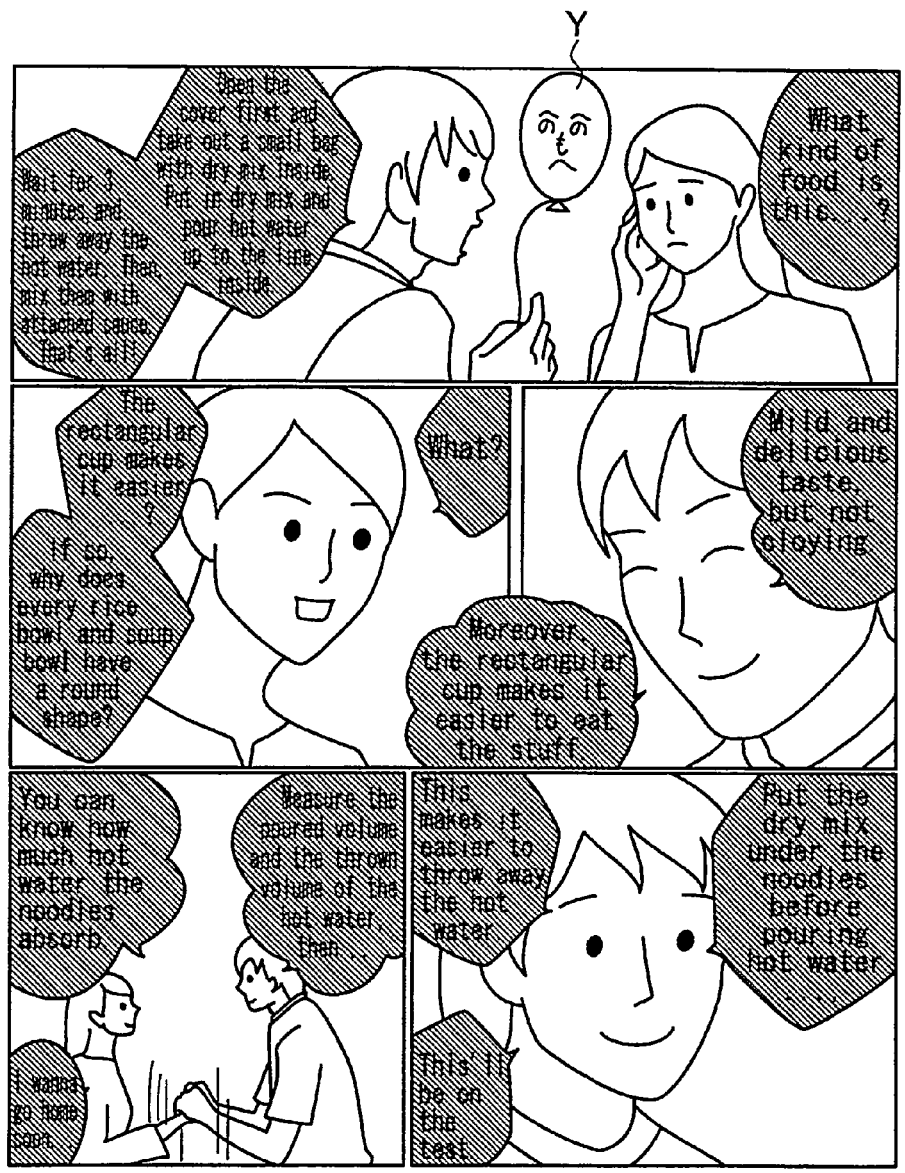
FIG. 13 illustrates a modification of the speech bubble extraction result shown in FIG. 12.

Since a balloon Y is a closed region, in the extraction result shown in FIG. 12, although the balloon Y is not a speech bubble, it is extracted as a speech bubble. This is caused from a false recognition of the characters in the balloon Y as a text. When the editor selects the balloon Y through the operation section 12, the authoring section 10 deletes the automatically selected closed region (in this case, inside of the balloon Y) from the speech bubble. As a result, hatching is deleted from the balloon Y as shown in FIG. 13.

(3) Modifying Speech Bubble Region when Speech Bubble is not Detected Clearly

Figure 14:
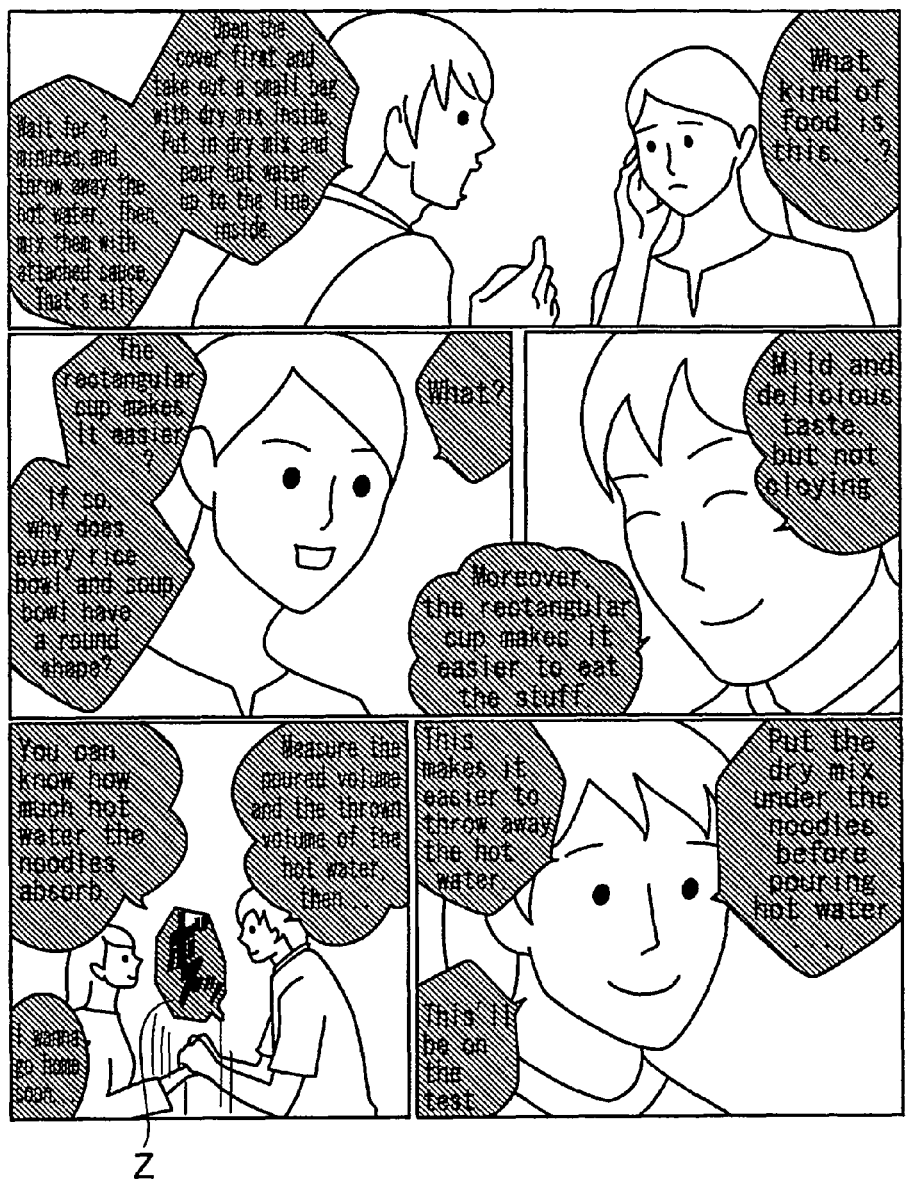
FIG. 14 illustrates a result of speech bubbles which are automatically extracted from the content image.
Figure 15:
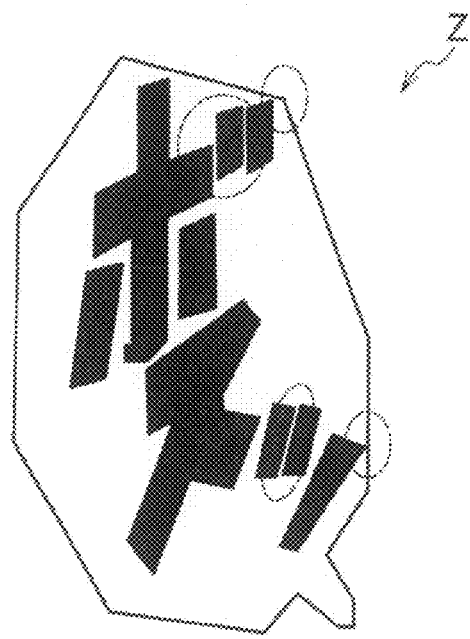
FIG. 15 illustrates an extraction of a speech bubble.

In an extraction result shown in FIG. 14, a part of a speech bubble Z at the top right is not extracted. This is caused when a character in the speech bubble is too close to the boundary line or in contact therewith as indicated with a chain line in FIG. 15; or when the characters in a speech bubble are too close to each other or in contact with each other as indicated with a two-dot chain line shown in FIG. 15.

Figure 16:
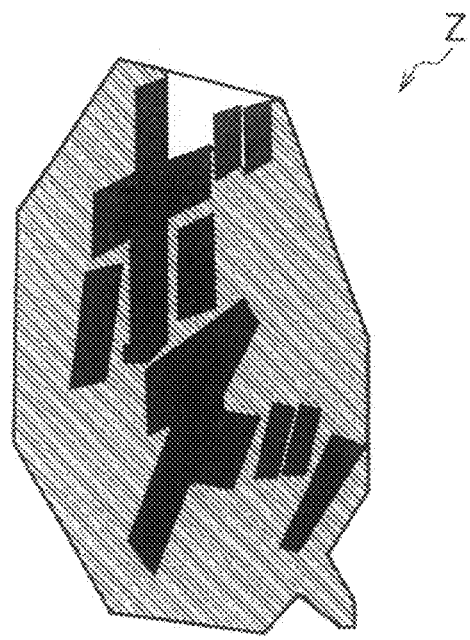
FIG. 16 illustrates an extraction of the speech bubble.
Figure 17:
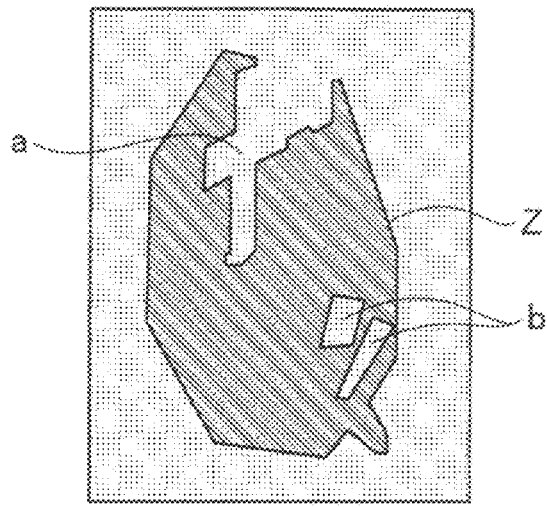
FIG. 17 illustrates an extraction of the speech bubble.
Figure 18:
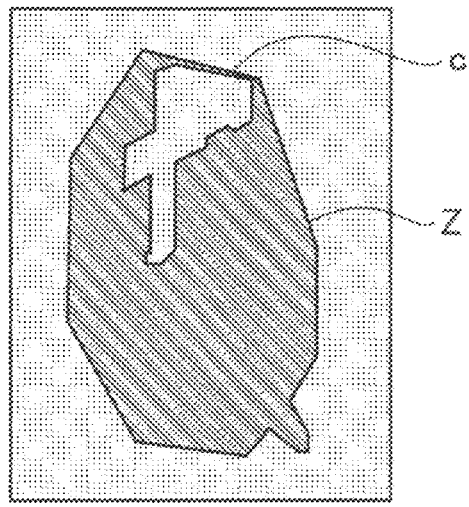
FIG. 18 illustrates an extraction of the speech bubble.
Figure 19:
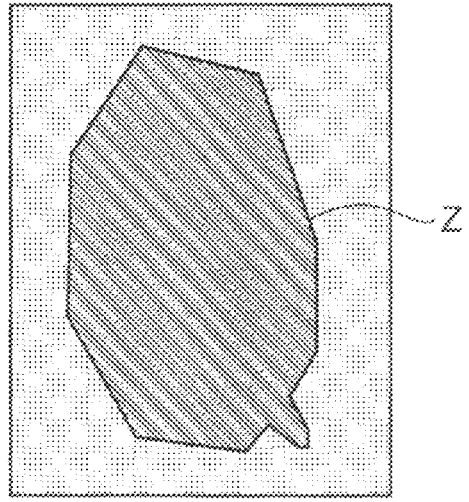
FIG. 19 illustrates an extraction of the speech bubble.

FIG. 16 is an enlarged view of the extraction result of the speech bubble Z shown in FIG. 14; FIG. 17 illustrates the extraction result shown in FIG. 16 from which characters are deleted. As shown in FIG. 17, in the speech bubble Z, a part of the boundary line is in contact with the character (FIG. 17-*a*); a part of the characters runs off the speech bubble (FIG. 17-*b*). Therefore, when the editor selects closed region b (refer to FIG. 17) in the speech bubble through the operation section 12, the authoring section 10 automatically determines the closed region b as a speech bubble as shown in FIG. 18. Also, when the editor adds a boundary line c of the speech bubble through the operation section 12 as shown in FIG. 18, the authoring section 10 automatically determines the closed region generated by the boundary line c (refer to FIG. 18) as a speech bubble as shown in FIG. 19. As a result, the speech bubble, which was not detected clearly, is extracted correctly as shown in FIG. 19.

When correction input of the extraction result of the speech bubble is made as described above, the authoring section 10 modifies the speech bubble information in the information file accordingly.

After completing the speech bubble setting (step S5), the authoring section 10 displays the original content image and the text recognition result of the content image which is automatically analyzed in step S3 on the monitor 15 next to each other, and receives correction input of the recognition result of the text made through the operation section 12 and performs the text setting based on the result (step S6).

Figure 20:
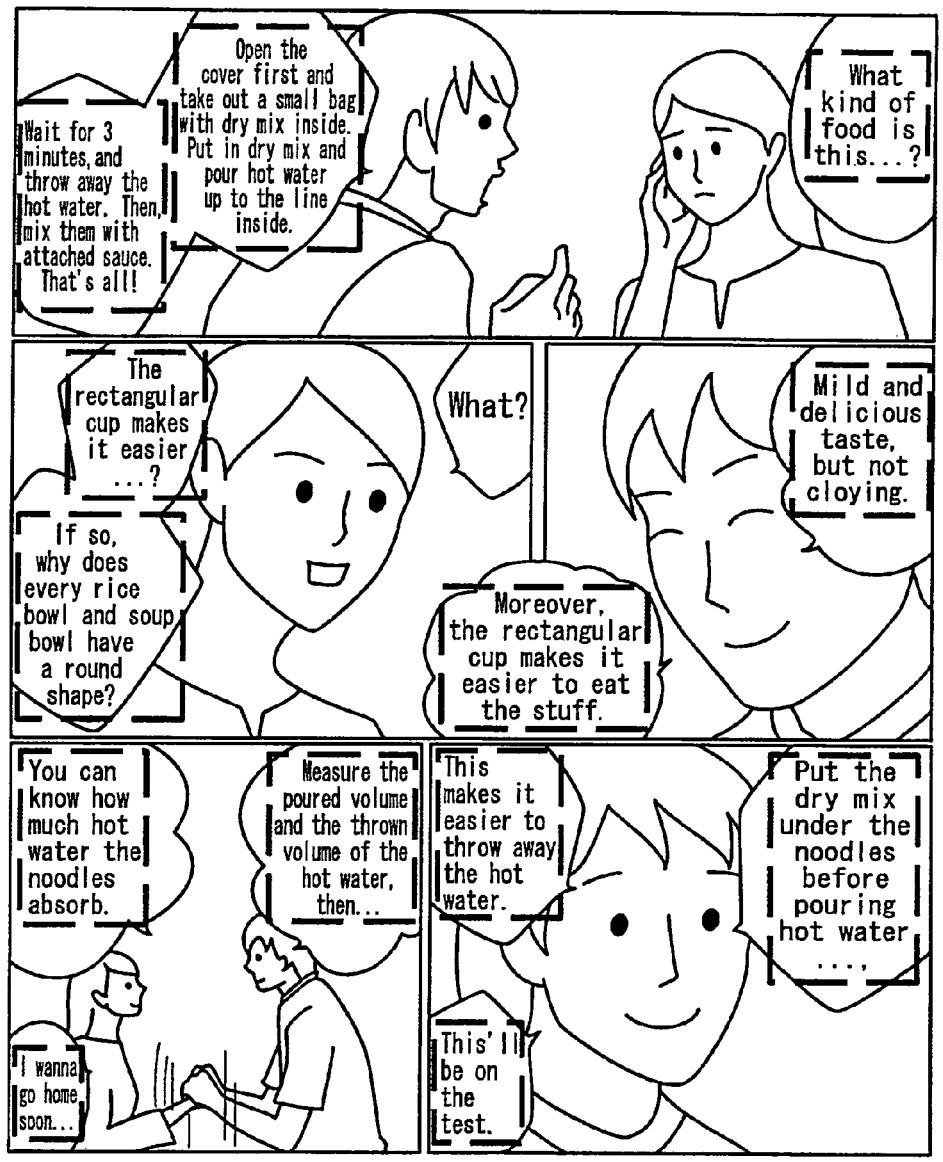
FIG. 20 illustrates a result of texts which are automatically extracted from the content image.

The processing in step S6 is described in detail. FIG. 20 illustrates a text recognition result obtained by automatic analysis of a content image (file ID: 1, file name: yakisoba_003) shown in FIG. 3. Actually, the content image shown in FIG. 3 and the recognition result shown in FIG. 20 are displayed on the monitor 15 next to each other. However, only the text recognition result shown in FIG. 20 may be displayed. The authoring section 10 displays the extraction result of the text based on the information file. The authoring section 10 displays an image in which the outer periphery edge of the text region in a thick line on the monitor 15 thereby the text region and other regions can be recognized. In FIG. 20, an image in which the outer periphery edge of the text region is drawn with a thick line is shown as the image indicating the text region. However, an image indicating text region, in which the text region is translucently covered over may be displayed. By covering over translucently, the editor can recognize the text.

(1) Adding Text

Figure 21:
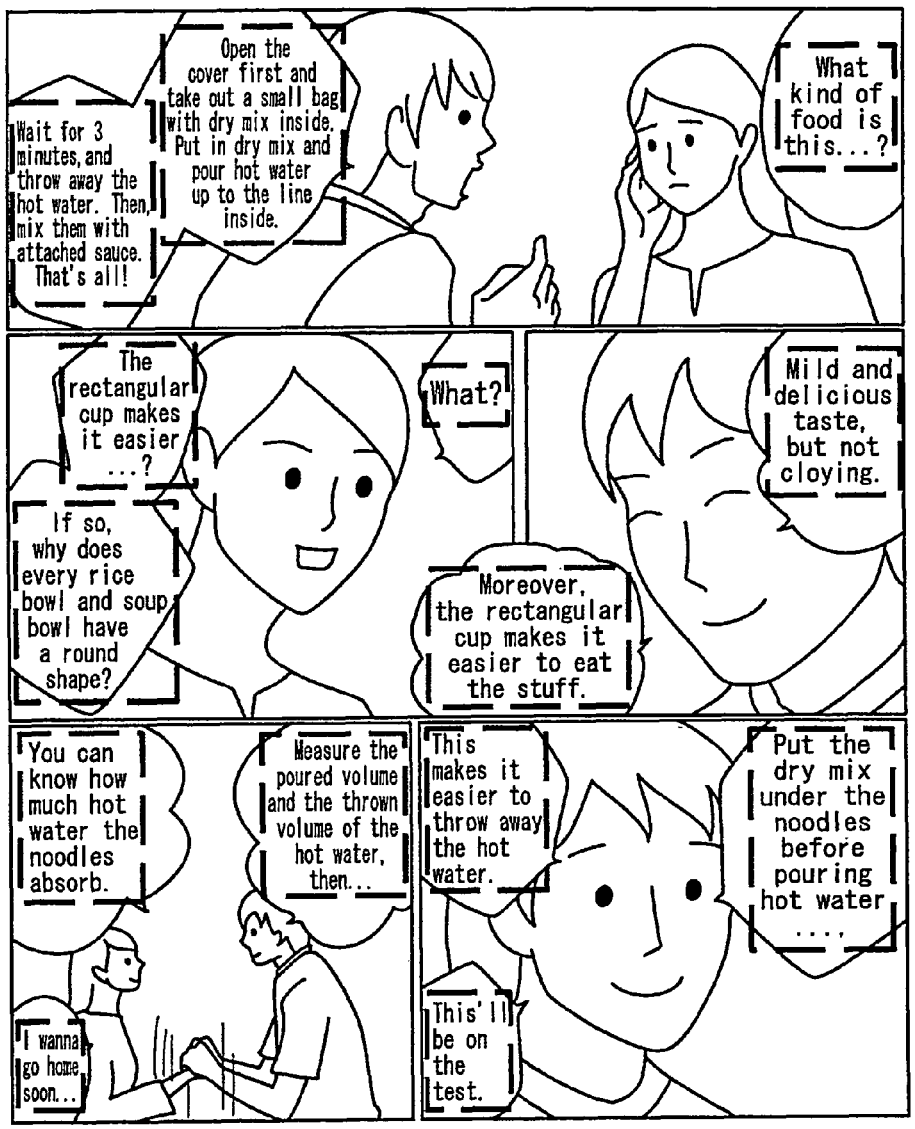
FIG. 21 illustrates a modification of the text extraction result shown in FIG. 20.

In FIG. 20, a text "What?" of hand written characters is not recognized. When the editor encloses "What?" through the operation section 12 to instruct to recognize the same, the authoring section 10 recognizes the closed region enclosing "What?" as a text region. As a result, "What?" is also set as a text region as shown in FIG. 21, and thus, the text region information is acquired.

After the text region is set, the character data is specified by the optical character reader of the authoring section 10. When the character data is not specified, the authoring section 10 prompts the editor to input, and the editor inputs the characters through the operation section 12. With this, the information on the content of the text is acquired.

When correction input of the text extraction result has been made as described above, the authoring section 10 modifies the text information in the information file.

(2) Deleting Text

When a text region is erroneously recognized, the editor selects a desired position on the erroneous text region through the operation section 12 and gives an instruction to perform recognition. Then, the authoring section 10 automatically deletes the text region selected from the information file. The authoring section 10 also deletes a piece of information on the text content of the deleted text region from the information file.

When the text setting (step S6) is completed, the authoring section 10 automatically extracts a region of interest (hereinafter, referred to as ROI) from the original content image (step S7). ROI means an item to be always displayed on the digital book viewer 2, which is a face (or a region equivalent to face) of a character in the original comic of the content image. The character includes not only a person but also an animal, a non-living material such as a telephone, a PC, electronic equipment and a robot.

The authoring section 10 includes a known image analysis technology, for example, a face detection device which automatically detects a face of a character by using a face detection technique, and the face detection device detects the face of the character from the content image. The authoring section 10 sets a polygonal shape region enclosing the detected face as a region of interest. The position, size, type of content elements such as animal, building, vehicle and other objects may be automatically detected based on the feature amount of information on the images by using known image analysis technology.

The authoring section 10 stores a piece of region of interest information which is a piece of information on the region of interest (ROI) in the information file. The region of interest information may be a piece of vector data representing coordinates of each vertex of the ROI, a shape of the ROI or an outer periphery edge of the ROI. The region of interest information further includes a piece of information on the characters included in the ROI (for example, automatically given character ID). Also, the region of interest information may include priority order, important degree to display, ID information (name etc) of the character, character's attributes (sex, age etc) and the like.

When the automatic extraction (step S7) of the ROI has completed, the authoring section 10 receives correction input of the ROI extraction result and performs ROI setting based on the result (step S8).

Figure 22:
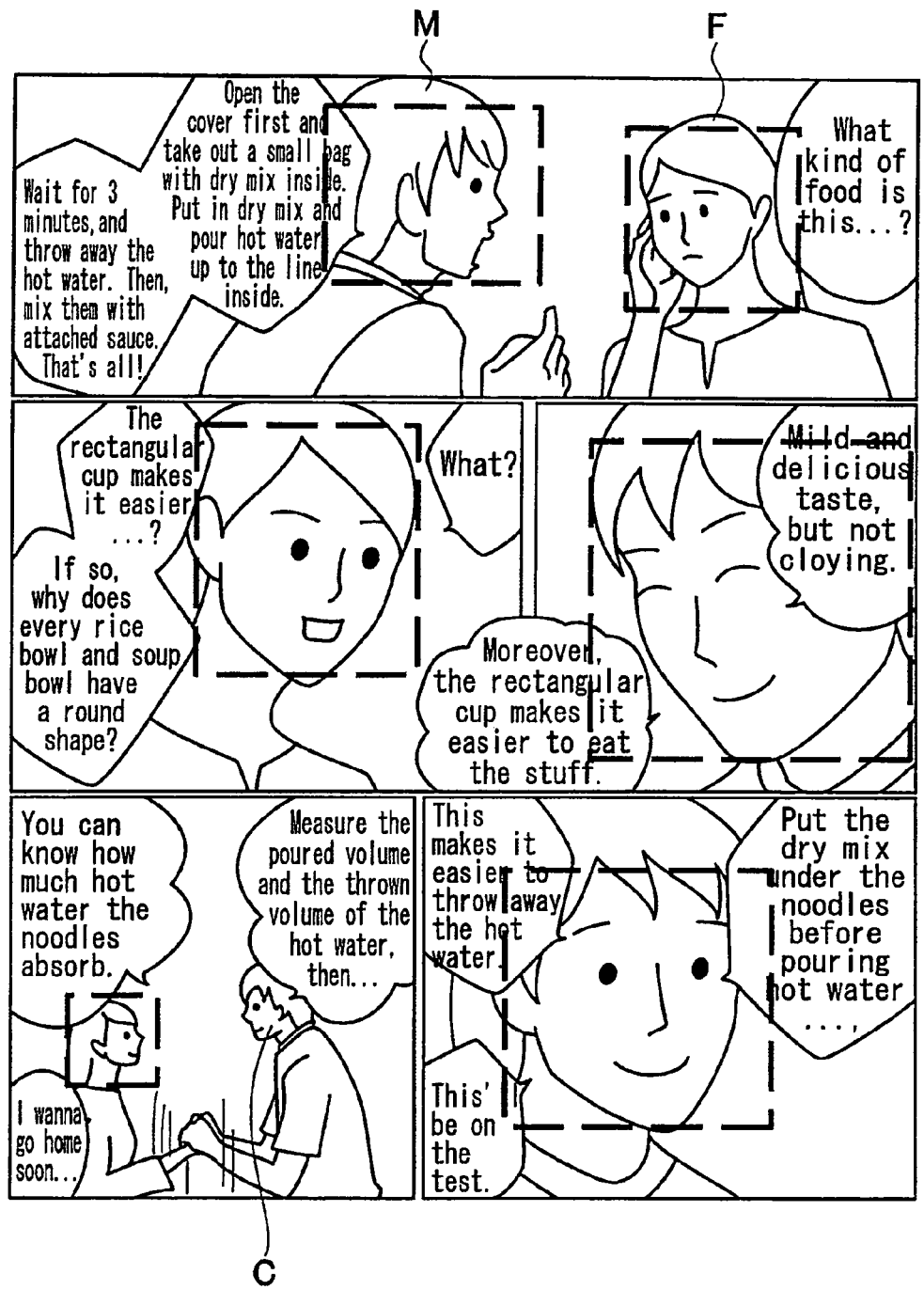
FIG. 22 illustrates a result of regions of interest which are automatically extracted from the content image.

The processing in step S8 is described in detail. FIG. 22 shows a ROI extraction result made through automatic analysis of the content image shown in FIG. 3 (file ID: 1, file name: yakisoba_003). Actually, the content image shown in FIG. 3 and the recognition result shown in FIG. 22 are displayed next to each other on the monitor 15. However, only the ROI extraction result shown in FIG. 22 may be displayed. The authoring section 10 displays the ROI extraction result based on the information file. The authoring section 10 displays the image with the outer periphery edge of the ROI thickly drawn on the monitor 15, to facilitate recognition of the ROI and other regions. In FIG. 22, the image in which the outer periphery edge of the ROI is thickly drawn is shown as an image representing the ROI. The translucently covered over ROI may be displayed as the image representing the ROI region. By translucently covering over, the editor can recognize the characters.

(1) Adding ROI

Figure 23:
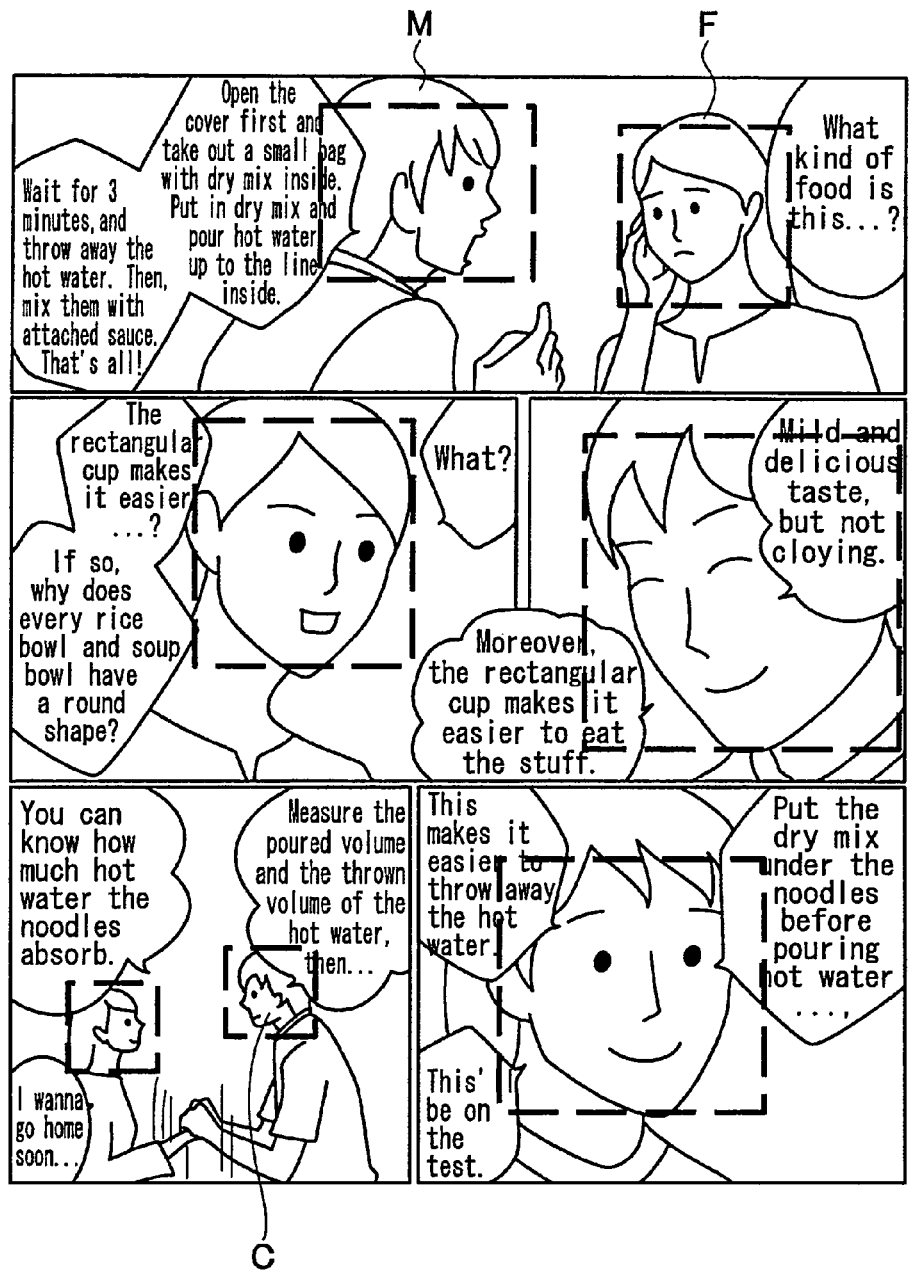
FIG. 23 illustrates a modification of the region of an interest extraction result shown in FIG. 20.

In FIG. 22, the characters include a man M and a woman F, a face C facing leftward of man M turning his head to a side is not recognized. When the editor selects a desired position on the face C facing leftward of the man M turning his head to a side through the operation section 12 and gives an instruction to perform recognition, the authoring section 10 recognizes a closed region including the indicated position as the ROI. Also, the authoring section 10 modifies the region of interest information in the information file accordingly. As a result, an image representing the ROI is displayed on the face C facing leftward of the man M as shown in FIG. 23.

(2) Deleting ROI

When the ROI is erroneously extracted, the editor selects a desired point on an incorrect ROI through the operation section 12 and gives an instruction to recognize. The authoring section 10 automatically deletes the region of interest information selected from the information file. With this, the image representing erroneous ROI is deleted from the monitor 15.

When the ROI setting (step S8) is completed, the authoring section 10 performs pairing to make a connection between the ROIs and the speech bubbles (step S9). The pairing makes a connection between a dialog in a speech bubble (speech bubble and text) and its generation source (ROI).

Figure 24:
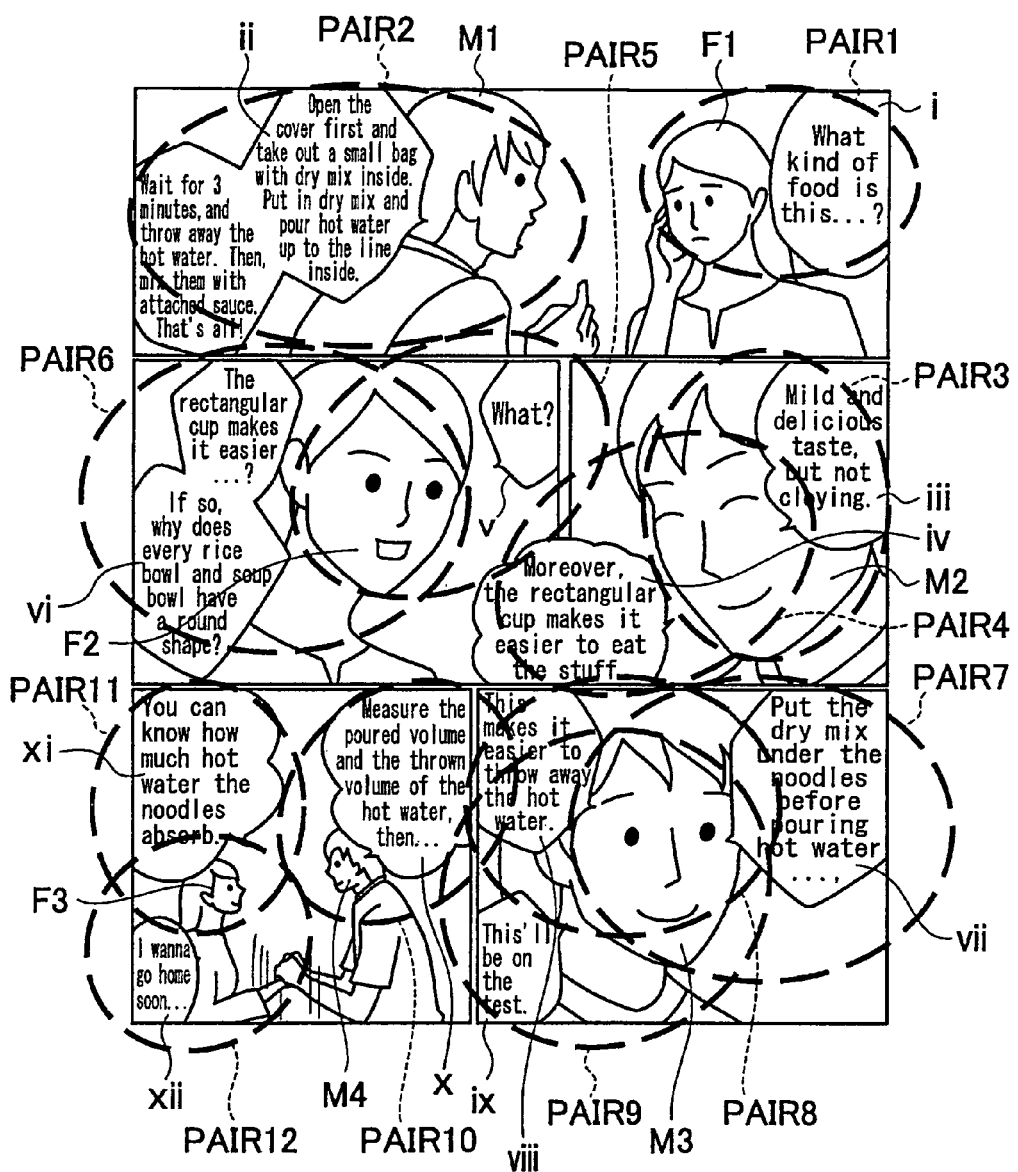
FIG. 24 illustrates pairing of the speech bubbles and the regions of interest.

FIG. 24 illustrates a result that speech bubbles, texts and ROIs are set in steps S5-S7. In FIG. 24, speech bubbles i-xii are included as the speech bubble; a woman F (F1-F3) and a man M (M1-M4) are included as the ROI. Although the woman F1-F3 is all the identical person (woman F), the expression of woman F1-F3 is employed for the sake of description. Likewise, although the man M1-M4 is all the identical person (man M), the expression of man M1-M4 is employed for the sake of description.

A method to perform the pairing manually is described. The authoring section 10 displays a content image on the monitor 15 based on the information file in a state the speech bubbles and ROIs, which are set in steps S5 and S7, are selectable. When the editor selects a predetermined speech bubble and an ROI one each through the operation section 12, the authoring section 10 recognizes the speech bubble and the ROI and sets the same as a pair. The speech bubble i is a speech of the woman F1. Therefore, when the speech bubble i and the woman F1 are selected through the operation section 12, the authoring section 10 automatically recognizes the speech bubble i and the woman F1 as a pair and sets the speech bubble i and the woman F1 as a pair 1. Likewise, when the speech bubble ii and the man M1 are selected through the operation section 12, the authoring section 10 automatically recognizes the speech bubble ii and the man M1 as a pair and sets the speech bubble ii and the man M1 as pair 2. After completing the pairing on every speech bubble, the authoring section 10 stores the pairing result in the information file.

Next, a description is made on the method that the authoring section 10 automatically performs the pairing first, and subsequently modification is made manually. The authoring section 10 automatically performs pairing on ROI and speech bubble neighboring each other based on the information file. In the case shown in FIG. 24, the speech bubble i and the woman F1 are set as pair 1; the speech bubble ii and the man M1 are set as pair 2; the speech bubble iii and the man M3 are set as pair 3; the speech bubble iv and the man M2 are set as pair 4; the speech bubble v and the woman F2 are set as pair 5; the speech bubble vi and the woman F2 are set as pair 6; the speech bubble vii and the man M3 are set as pair 7; the speech bubble viii and the man M3 are set as pair 8; the speech bubble ix and the man M3 are set as pair 9; the speech bubble x and the man M4 are set as pair 10; the speech bubble xi and the woman F3 are set as pair 11; and the speech bubble xii and the woman F3 are set as pair 12.

The authoring section 10 stores the pairing result in the information file, and displays the content image on the monitor 15 in a state in which the pairing result is recognizable based on the information file. For example, an image in which a pair is enclosed by a dotted line is displayed being superimposed on a content image.

When the editor selects an image in which a predetermined pair is enclosed with a dotted line through the operation section 12, the authoring section 10 receives the modification of the pair. In the example shown in FIG. 24, the speech bubble xi should not be paired with the woman F3 but with the man M4. Therefore, the pair 11 should be modified. When the editor double-clicks the pair 11 through the operation section 12, the pair 11 gets ready to be edited. When the speech bubble xi and the man M4 are selected, the authoring section 10 reset the speech bubble xi and the man M4 as the pair 11, and modifies the information file.

Figure 25:
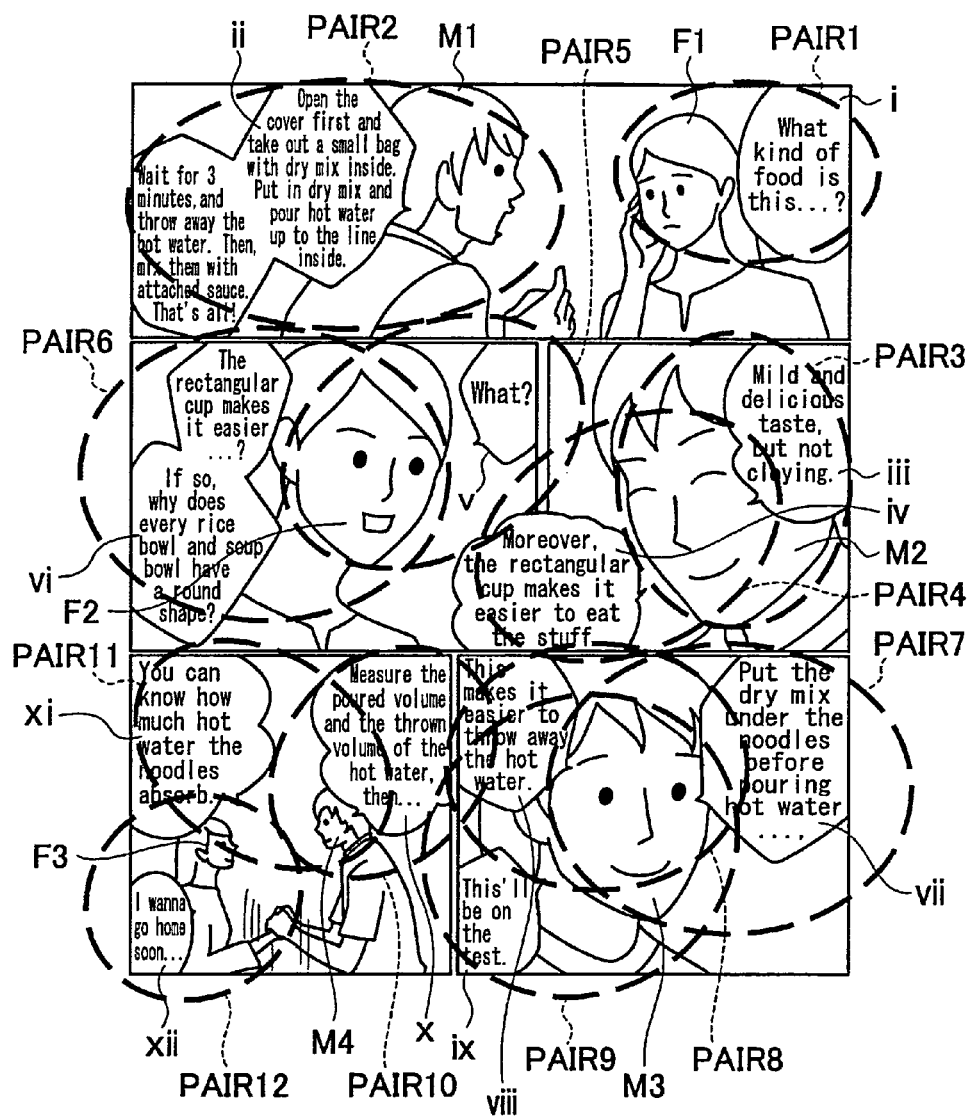
FIG. 25 illustrates pairing of the speech bubbles and the regions of interest.

The authoring section 10 displays the content image in a state the pairing result is recognizable on the monitor 15 based on the modified information file. As a result, the modification result of the pair 11 can be checked on the monitor 15 as shown in FIG. 25.

The pairing may be allotted with a number. The authoring section 10 may allot numbers from the pairing of the speech bubble located at the top right, or may allot numbers based on the input through the operation section 12. The numbers may represent the display order of the speech bubble.

Finally, the authoring section 10 stores a master data including the information file updated in steps S4-S9 and the content image in the DB 11 (step S10).

Figure 26:
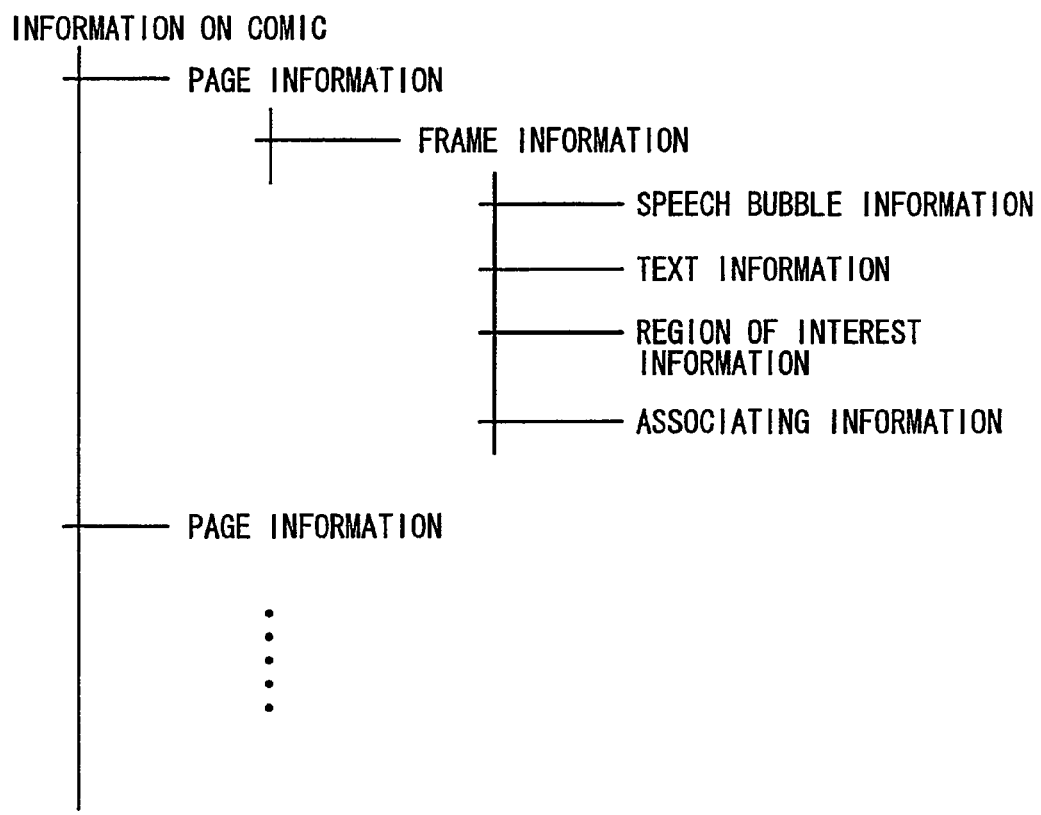
FIG. 26 is a frame format of a structure of an information file.

FIG. 26 illustrates a structure of the master data. In this embodiment, since each comic has an information file, the information file includes plural pieces of page information. The respective pages have a piece of page information; a piece of frame information is made connected with the page information; and the speech bubble information (text information) and the region of interest information are made connected with the frame information. The information file may be created not for each comic but for each page.

By creating the master data, it is made possible to edit the content in accordance with the digital book viewer, automatic translation of the text, translation editing and sharing and display processing appropriate for digital book viewer, and delivery of the digital book is facilitated.

In this embodiment, the authoring section 10 acquires a content image and creates a master data which stores the frame information, the speech bubble information, the text information and the like. However, the authoring section 10 may acquire a master data (equivalent to the master data created in step S2 shown in FIG. 2) which has an information file storing various kinds of information, and then perform the processing in steps S3-S10 and may store a final master data in the DB. Also, the authoring section 10 may acquire a master data (equivalent to the master data created in step S3 shown in FIG. 2) which has an information file in which frames, speech bubbles and texts are automatically extracted, and the frame information, the speech bubble information and the text information are stored, and may store a final master data in the DB after performing the processing in steps S4-S10.

(B) Master Data Edition Processing

Figure 27:
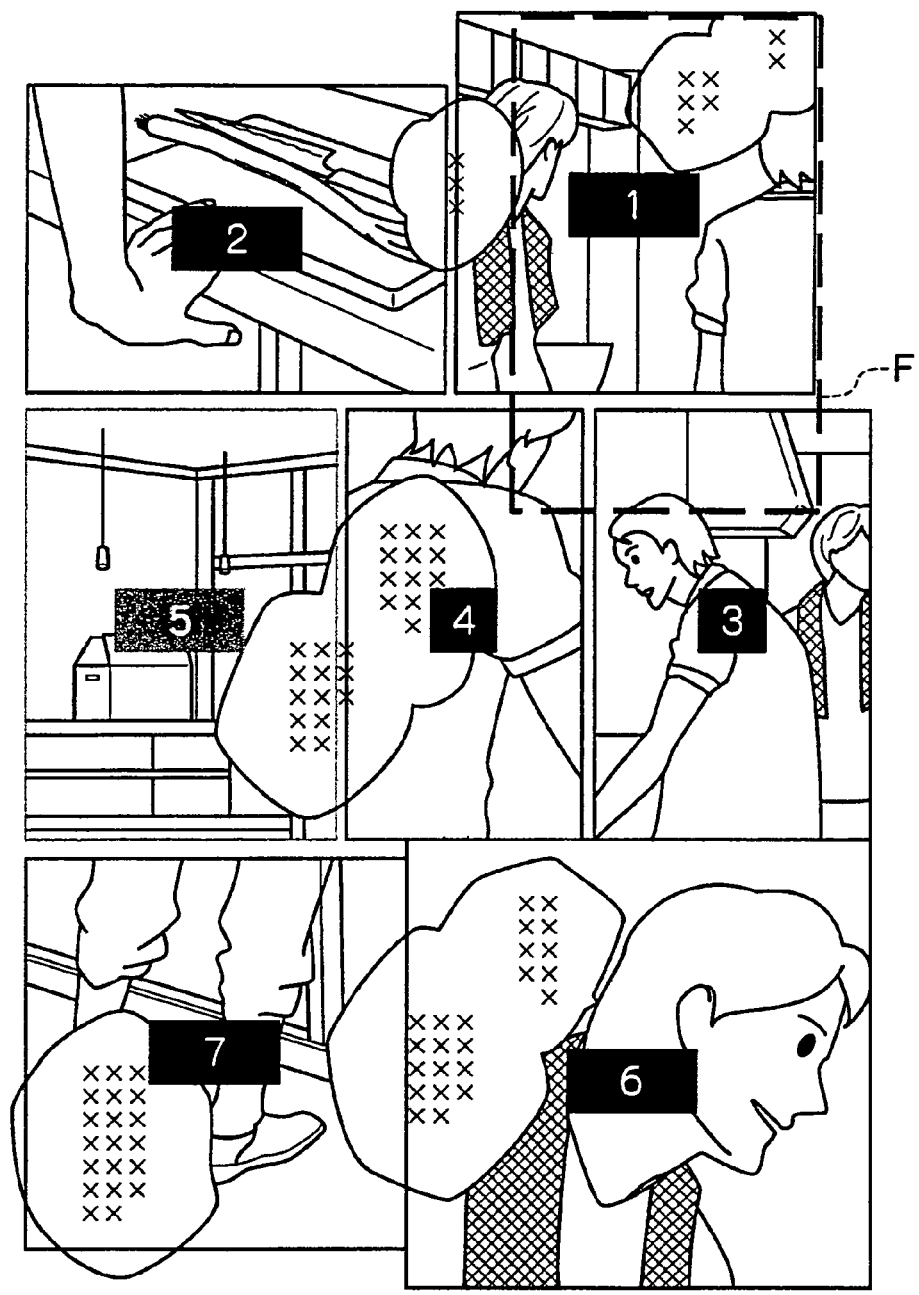
FIG. 27 is an example of a monitor screen when editing master data.

FIG. 27 illustrates a display screen for performing editing for a digital book viewer. The authoring section 10 displays a content image on the monitor 15. The authoring section 10 displays the frame boundary line of each frame with a thick line based on the information file. Roughly in the center of each frame, a frame order representing reading order of the frame is displayed. The display of the frame order is not limited to the above, but the frame order may be displayed at a corner of the frame.

The authoring section 10 also acquires the screen size of the digital book viewer 2 from the DB 11 or the like to display a border F representing the screen size of the digital book viewer 2 while superimposing the same on the content image based on the information on the screen size of the digital book viewer 2 and a piece of information from the information file.

Here, it is assumed that a specific mobile terminal (for example, a smartphone) is used as the digital book viewer 2. A border F representing the screen size is displayed on, for example, an image being displayed with 1500×2500 dots per page based on a piece of information on the screen size of the smartphone (for example, 480×960 pixels).

When an editor inputs an indication to shift the border F in a horizontal/vertical direction though the operation section 12, the authoring section 10 shifts the border F in the horizontal/vertical direction in accordance with the indication from the operation section 12. With this, the editor can check what range in one page can be viewed on one screen of the mobile terminal.

Also, the authoring section 10 calculates the minimum number of display times necessary for the mobile terminal to display every frames (i.e., scroll times) based on the information on the screen size of the mobile terminal and the information of the information file (frame region information), and displays the information (marker) while superimposing the same on the content image. According to the embodiment of the invention, the marker is displayed in a roughly central area of each frame. Referring to FIG. 27, the frame order is displayed being superimposed on the marker.

Referring to FIG. 27, a rectangular-shape marker represents the scroll times. When the scroll time is one like the frames with frame order 3 and 4 in FIG. 27, a marker of a square shape which has a predetermined side length of a is displayed. When the scroll times are two or more in a horizontal direction or a vertical direction, a marker of a rectangular shape which has a side length of integral multiple of a in the horizontal direction or vertical direction is displayed. That is, when the scroll in the vertical direction is n times, and the scroll in the horizontal direction is m times, a marker of a rectangular shape which has length of na×ma in the vertical direction and the horizontal direction is displayed.

In the frame with frame order 1, 2, 6 and 7 in FIG. 27, the scroll times in the horizontal direction is two and the scroll time in the vertical direction is one. The marker of a rectangular shape in which the length in the horizontal direction is 2 a, and a in the vertical direction is displayed. By displaying a marker as described above, the scroll times can be understood only by looking at the marker without superimposing the border F on each frame.

Figure 28:
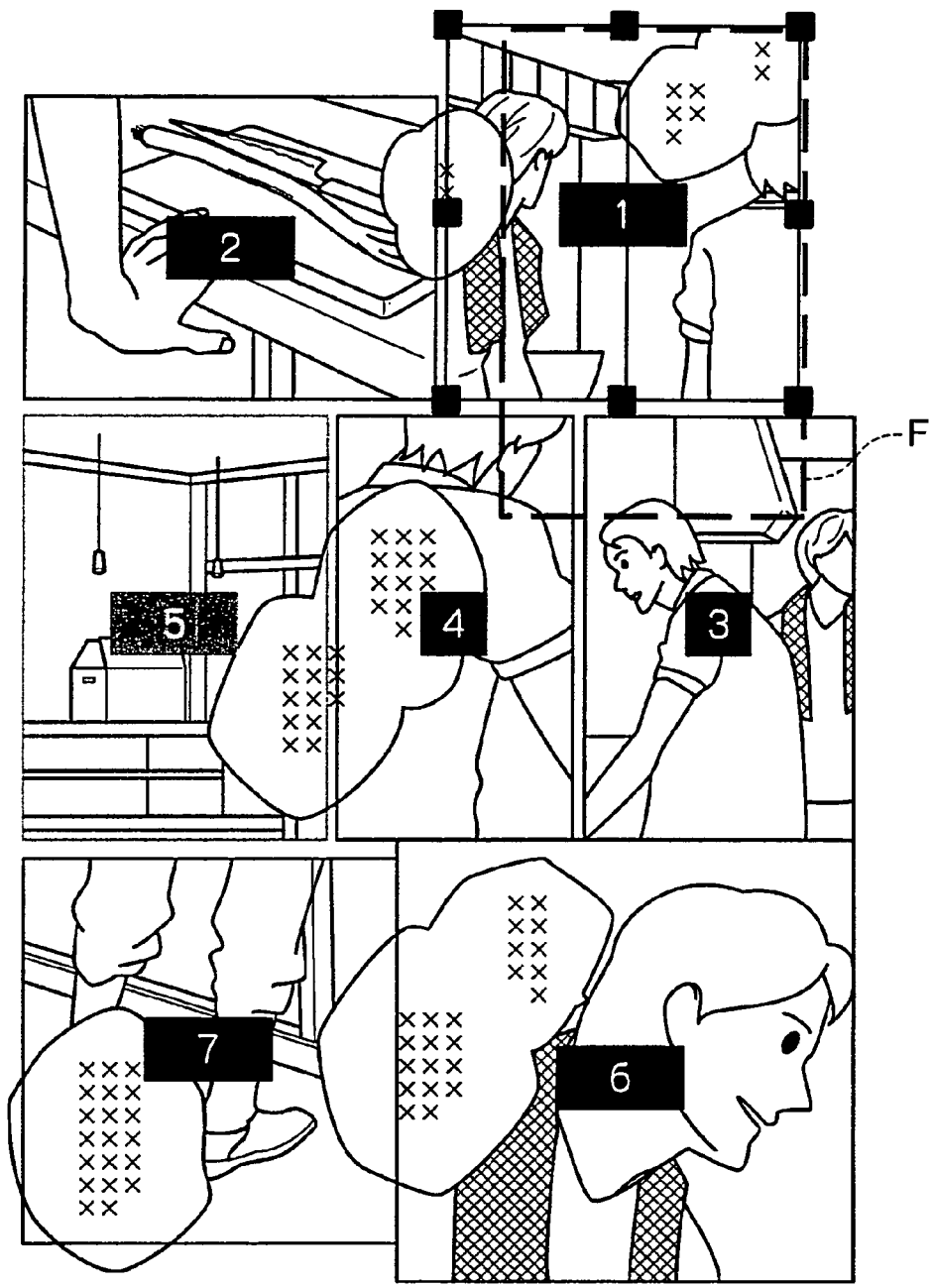
FIG. 28 is an example of the monitor screen when editing master data.

Thus, the editor appropriately shifts the frame boundary while monitoring the image displayed on the monitor 15. When the editor makes a double click or the like on the frame boundary through the operation section 12, the authoring section 10 displays vertexes on the frame boundary permitting editing of the frame boundary as shown in FIG. 28. Same as in step S4 (FIG. 9), when the editor drags a desired frame boundary or vertex through the operation section 12, the frame boundary or vertex is shifted; and thus the shape of the frame is corrected. By repeating the above operation, the shape and the size of the frame can be changed (for example, from a pentagon to a rectangle). Also by adding or deleting a vertex, the frame can be added or deleted. Since the method of adding/deleting a vertex is the same as step S4, the description thereof is omitted.

When the size of the frame is slightly larger than the screen size of the mobile terminal, the authoring section 10 displays a frame boundary of the frame slightly larger than the screen size of the mobile terminal with a color different from that of other frame boundary based on the information on the screen size of the mobile terminal and the information of the information file. As to the case that the size of the frame in the vertical/horizontal direction is slightly larger than that of the screen size of the mobile terminal, the following case is conceivable. That is, for example, defining about 10% of the screen size of the mobile terminal as a threshold value, the length of the side of the frame is larger by about 10% than the screen size of the mobile terminal. In FIG. 27, the frame boundary of the frame with frame order 5 is represented by a color (tone) different from the other frame boundary.

In the case that a frame in which the screen size of the mobile terminal is slightly larger, the frame boundary is virtually shifted with respect to the actual frame boundary so that a part of the frame with no importance is excluded from the frame. The frame region information representing the frame boundary can be edited by shifting the frame boundary. By correcting (editing) the frame region information representing the position of the actual frame boundary as described above so as to match with the screen size of the mobile terminal, and excessive scroll can be eliminated. Thus, the image can be viewed efficiently by scrolling the image based on the frame region information on the mobile terminal.

Figure 29:
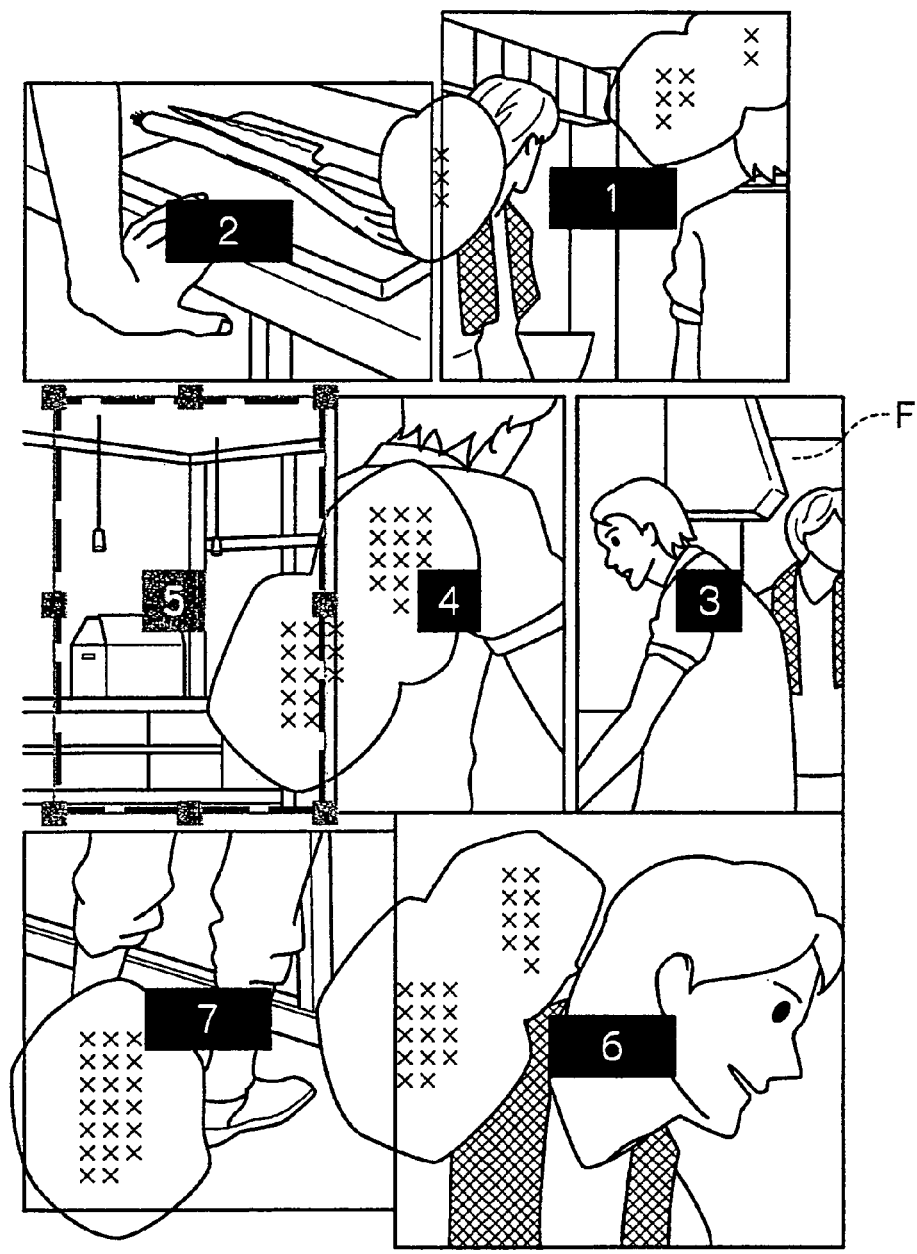
FIG. 29 is an example of the monitor screen when editing master data.

For example, when the position of the frame boundary of the frame with frame order 5, which is slightly larger than the border F shown in FIG. 28, is corrected to a position of the frame boundary of the frame with frame order 5 shown in FIG. 29, the scroll time of the frame results in one. In FIG. 29, a part at the left end of the frame with frame order 5 is reduced so as to be excluded form the frame; thereby the scroll time results in one.

When the scroll times are changed, the authoring section 10 detects the change and updates the information file. Also, the authoring section 10 changes the size of the marker to a×a, and changes the color of the frame boundary of the frame with frame order 5 to the same color as the other frames.

The frame boundary may be deleted or added. In a state that a predetermined frame is selected, when the editor selects the predetermined frame boundary of a frame through the operation section 12, the selected frame is deleted. For example, in the case when the size of the frame is small, and when two frames are included in the border F, the two frames are virtually handled as one frame; thereby efficient display is obtained.

Figure 30:
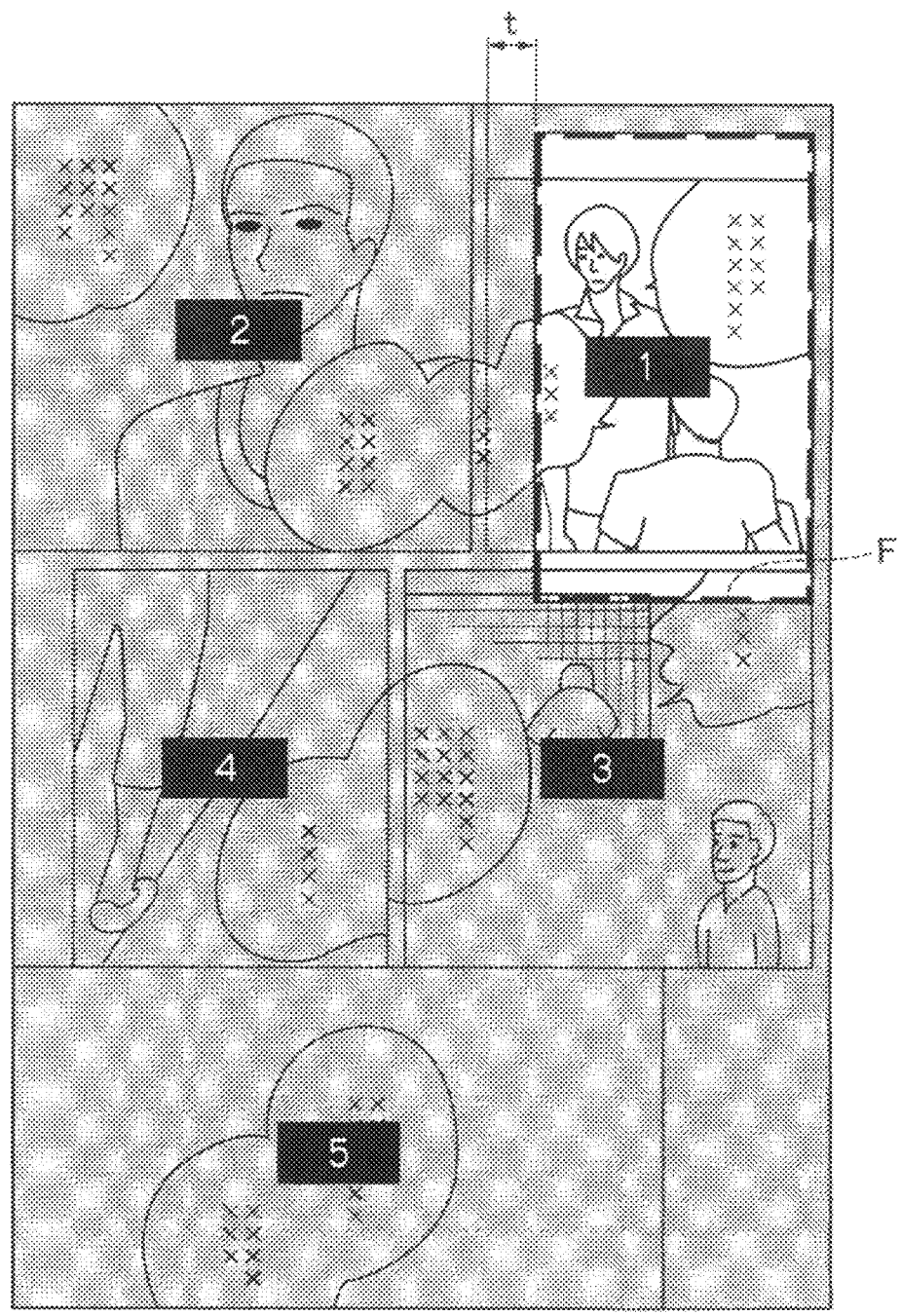
FIG. 30 is an example of a preview screen.

The authoring section 10 is also capable of displaying a preview screen on the monitor 15. FIG. 30 illustrates an example of the preview screen. The authoring section 10 displays a content image on the monitor 15 while superimposing the border F representing the screen size of the mobile terminal on the content image. The authoring section 10 translucently covers over the outside of the border F to preview screen which is visible only the inside of the border F. Not only translucently covering over the outside of the border F, the outside of the border F may be covered over with gray color.

When the editor gives an instruction through the operation section 12, the authoring section 10 scrolls the border F to display the next preview screen. When any frame is rest without being previewed, the authoring section 10 shifts the border F to show every frame under being previewed to translucently display the outside of the border F so that every frame can be previewed. In the example shown in FIG. 30, the border F is shifted leftward by a distance of "t".

When the preview is completed on every frame under being previewed, the authoring section 10 shift the border F so that the right end of the frame with next frame order aligns with the right end of the border F, and translucently displays the outside of the border F.

With this, the user can check the state of the images on the digital book viewer 2. Accordingly, the master data can be edited more appropriately.

[Other Configuration]

According to the embodiment, master data of the content of a digital comic is created and edited by the delivery server of a digital book. However, as for the apparatus for creating the master data may be a digital comic editor different from the server which delivers the content. The digital comic editor may be configured with a general purpose personal computer in which a digital comic editing program according to the invention is installed via a storing medium storing the same.

The master data which is created and edited as described above is delivered through a server (delivery server) responding to a delivery request from various mobile terminals. In this case, the delivery server acquires a piece of information on the model of the mobile terminal. The master data may be delivered after being processed into the data suitable for browsing by the model (screen size etc); the master data may be delivered without being processed. When the master data is delivered without being processed, the master data has to be converted into the data suitable for the mobile terminal using viewer software at the mobile terminal side before the master data can be browsed. However, the master data includes an information file as described above. The viewer software uses the information described in the information file to display the content on the mobile terminal.

The invention is not limited to the above-described embodiment. Needless to say, various modifications are possible within a range of the spirit of the invention.

What is claimed is:

1. A digital comic editor, comprising: a data acquisition device configured to acquire a piece of master data of a digital comic,
    the master data including:
        an image file corresponding to each page of the comic, the image file having a high resolution image of the entire page, and
        an information file corresponding to each page or all pages of the comic, the information file having a piece of frame information including a piece of frame region information of each frame within the page;
    a size information acquisition device configured to acquire a piece of size information representing a screen size of a predetermined mobile terminal which is used for viewing the digital comic;
    a first display control device configured to control to display an image on a display device based on the image file in the master data acquired by the data acquisition device and to display a frame boundary while superimposing the same on the image based on the frame information included in the information file in the master data;
    a second display control device configured to display a border line representing the screen size while superimposing the border line on the image based on the size information acquired by the size information acquisition device;
    a third display control device configured to control, with respect to each frame segmented by the frame boundary, to display a piece of information representing a predetermined threshold number of display times necessary for displaying the entire image within the frame on the screen size of the predetermined mobile terminal;
    a shift indication device configured to cause the display position of the border line to shift on the image;
    an indication device configured to indicate a position on the image displayed on the display device;
    a frame boundary correction device configured to receive the indication input to correct the position of the frame boundary indicated by the indication device and corrects the frame boundary according to the received indication input; and
    an editing device configured to update a piece of frame region information included in the information file with a frame boundary of the image in the page of the digital comic corrected by the frame boundary correction device according with the screen size of the predetermined mobile terminal.

2. The digital comic editor according to claim 1, further comprising:
    a frame addition device configured to add a new frame boundary to a position indicated by the indication device; and
    a frame deletion device configured to delete a frame boundary from a position indicated by the indication device according with the screen size of the predetermined mobile terminal,
    wherein the editing device updates a piece of frame region information included in the information file based on the frame boundary added by the frame addition device or the frame boundary deleted by the frame deletion device.

3. The digital comic editor according to claim 2, further comprising:
    the image acquisition device configured to acquire the image file having the high resolution image of the entire page;

the frame region extraction device configured to analyze the image of the entire page acquired by the image acquisition device and automatically extracts the frame region of the frames within the page;

the information file creation device configured to create the information file having described therein the piece of frame information including the piece of frame region information representing the frame region extracted by the frame region extraction device; and the master data creation device configured to create a piece of master data of the digital comic, the master data including:

the image file of each page of the comic acquired by the image acquisition device, and the information file corresponding to each page or all pages of the comic created by the information file creation device, wherein the data acquisition device acquires the piece of master data created by the master data creation device.

4. The digital comic editor according to claim 1, wherein the information representing the number of display times is, for one display time, a marker having a square shape of side length a; and for the case of n-times in a vertical direction and m-times in the horizontal direction, a marker having a rectangular shape of na.times.ma in the vertical and horizontal directions.

5. The digital comic editor according to claim 4, further comprising the fourth display control device configured to display a number representing frame order representing read order of the frames on a rectangular marker which is displayed on each frame based on a piece of frame order information, wherein the frame information includes the frame order information representing the read order of the frames within the page.

6. The digital comic editor according to claim 5, further comprising:

the image acquisition device configured to acquire the image file having the high resolution image of the entire page;

the frame region extraction device configured to analyze the image of the entire page acquired by the image acquisition device and automatically extracts the frame region of the frames within the page;

the information file creation device configured to create the information file having described therein the piece of frame information including the piece of frame region information representing the frame region extracted by the frame region extraction device; and the master data creation device configured to create the piece of master data of the digital comic, the master data including:

the image file of each page of the comic acquired by the image acquisition device, and the information file corresponding to each page or all pages of the comic created by the information file creation device, wherein the data acquisition device acquires the piece of master data created by the master data creation device.

7. The digital comic editor according to claim 4, further comprising:

the image acquisition device configured to acquire the image file having the high resolution image of the entire page;

the frame region extraction device configured to analyze the image of the entire page acquired by the image acquisition device and automatically extracts the frame region of the frames within the page;

the information file creation device configured to create the information file having described therein the piece of frame information including the piece of frame region information representing a frame region extracted by the frame region extraction device; and the master data creation device configured to create the piece of master data of the digital comic, the master data including:

the image file of each page of the comic acquired by the image acquisition device, and an information file corresponding to each page or all pages of the comic created by the information file creation device, wherein the data acquisition device acquires the piece of master data created by the master data creation device.

8. The digital comic editor according to claim 1, further comprising:

the image acquisition device configured to acquire the image file having the high resolution image of the entire page;

the frame region extraction device configured to analyze the image of the entire page acquired by the image acquisition device and automatically extracts the frame region of the frames within the page;

the information file creation device configured to create the information file having described therein the piece of frame information including the piece of frame region information representing the frame region extracted by the frame region extraction device; and the master data creation device configured to create the piece of master data of the digital comic, the master data including:

the image file of each page of the comic acquired by the image acquisition device, and the information file corresponding to each page or all pages of the comic created by the information file creation device, wherein the data acquisition device acquires the piece of master data created by the master data creation device.

9. The digital comic editor according to claim 1, further comprising a frame detection device configured to detect a frame the horizontal or vertical size of which is larger than the size of the screen size in the horizontal or vertical direction and is smaller than a predetermined threshold value, wherein the first display control device displays a periphery frame boundary of the frame detected by the frame detection device distinguishably from other frame boundaries according with the screen size of the predetermined mobile terminal.

10. The digital comic editor according to claim 9, further comprising:

the image acquisition device configured to acquire the image file having the high resolution image of the entire page;

the frame region extraction device configured to analyze the image of the entire page acquired by the image acquisition device and automatically extracts the frame region of the frames within the page;

the information file creation device configured to create an information file having described therein the piece of frame information including the piece of frame region information representing the frame region extracted by the frame region extraction device; and the master data creation device configured to create the piece of master data of the digital comic, the master data including:
the image file of each page of the comic acquired by the image acquisition device, and
the information file corresponding to each page or all pages of the comic created by the information file creation device,
wherein the data acquisition device acquires the piece of master data created by the master data creation device.

11. The digital comic editor according to claim 1, further comprising:
a selection device configured to select a preview display mode according with the screen size of the predetermined mobile terminal; and
a fifth display control device configured to, when the preview display mode is selected by the selection device according with the screen size of the predetermined mobile terminal, pick up an image for one page having a size equivalent to the screen size of the mobile terminal from the image of the image file based on the frame information written in the information file and displays the picked up image on the display device while shifting the picked up position in order.

12. The digital comic editor according to claim 11, further comprising:
the image acquisition device configured to acquire the image file having the high resolution image of the entire page;
the frame region extraction device configured to analyze the image of the entire page acquired by the image acquisition device and automatically extracts the frame region of the frames within the page;
the information file creation device configured to create an information file having described therein the piece of frame information including the piece of frame region information representing the frame region extracted by the frame region extraction device; and
the master data creation device configured to create the piece of master data of the digital comic,
the master data including:
the image file of each page of the comic acquired by the image acquisition device, and
the information file corresponding to each page or all pages of the comic created by the information file creation device,
wherein the data acquisition device acquires the piece of master data created by the master data creation device.

13. The digital comic editor according to claim 1, further comprising
a fourth display control device configured to control to display the frame order representing read order of the frames while superimposing the frame order on the image of each frame based on the piece of frame order information,
wherein the frame information includes the frame order information representing the read order of the frames within the page.

14. The digital comic editor according to claim 13, further comprising a frame order correction device configured to receive the indication input to correct the frame order of the frame indicated by the indication device and corrects the frame order information responding to the received indication input.

15. The digital comic editor according to claim 13, further comprising:
the image acquisition device configured to acquire the image file having the high resolution image of the entire page;
the frame region extraction device configured to analyze the image of the entire page acquired by the image acquisition device and automatically extracts the frame region of the frames within the page;
the information file creation device configured to create the information file having described therein the piece of frame information including the piece of frame region information representing the frame region extracted by the frame region extraction device; and
the master data creation device configured to create the piece of master data of the digital comic,
the master data including: the image file of each page of the comic acquired by the image acquisition device, and
the information file corresponding to each page or all pages of the comic created by the information file creation device,
wherein the data acquisition device acquires the piece of master data created by the master data creation device.

16. The digital comic editor according to claim 1, wherein the frame region information of the frame is a piece of coordinate data on each vertex on a polygonal frame boundary enclosing each frame;
a piece of vector data representing the frame boundary or a piece of mask data representing a frame region of each frame.

17. The digital comic editor according to claim 1, further comprising:
an image acquisition device configured to acquire the image file having a high resolution image of the entire page;
a frame region extraction device configured to analyze the image of the entire page acquired by the image acquisition device and automatically extracts the frame region of the frames within the page;
an information file creation device configured to create an information file having described therein a piece of frame information including a piece of frame region information representing the frame region extracted by the frame region extraction device; and
a master data creation device configured to create a piece of master data of the digital comic,
the master data including:
the image file of each page of the comic acquired by the image acquisition device, and
the information file corresponding to each page or all pages of the comic created by the information file creation device,
wherein the data acquisition device acquires the piece of master data created by the master data creation device.

18. A digital comic editing method, comprising:
a data acquisition step acquiring a piece of master data of a digital comic,
the master data including:
an image file corresponding to each page of the comic, the image file having a high resolution image of the entire page, and
an information file corresponding to each page or all pages of the comic, the information file having a piece of frame information including a piece of frame region information of each frame within the page;
a size acquisition step acquiring a piece of size information representing a screen size of a predetermined mobile terminal which is used for viewing the digital comic;
a first display control step controlling to display an image on a display device based on the image file in the master data acquired in the data acquisition step and displaying a frame boundary while superimposing the same on the image based on the frame information included in the information file in the master data;

a second display control step displaying a border line representing the screen size while superimposing the border line on the image based on the size information acquired in the size information acquisition step;

a third display control device configured to control, with respect to each frame segmented by the frame boundary, to display a piece of information representing a predetermined threshold number of display times necessary for displaying the entire image within the frame on the screen size of the predetermined mobile terminal;

a shift indication step causing the display position of the border line to shift on the image; an indication step indicating a position on the image displayed on the display device;

a frame boundary correction step receiving the indication input to correct the position or the shape of the frame boundary indicated by the indication step and correcting the frame boundary according to the received indication input; and an editing step updating a piece of frame region information included in the information file with a frame boundary of the image in the page of the digital comic corrected by the frame boundary correction device according with the screen size of the predetermined mobile terminal.

19. A non-transitory computer-readable medium storing a digital comic editing program causing a computer to execute:

a data acquisition step to acquire a piece of master data of a digital comic, the master data including:

an image file corresponding to each page of the comic, the image file having a high resolution image of the entire page, and an information file corresponding to each page or all pages of the comic, the information file having a piece of frame information including a piece of frame region information of each frame within the page;

a size information acquisition step to acquire a piece of size information representing a screen size of a predetermined mobile terminal which is used for viewing the digital comic;

a first display control step to control to display an image on a display device based on the image file in the master data acquired by the data acquisition step and to display a frame boundary while superimposing the same on the image based on the frame information included in the information file in the master data;

a second display control step to display a border line representing the screen size while superimposing the border line on the image based on the size information acquired by the size information acquisition step;

a third display control device configured to control, with respect to each frame segmented by the frame boundary, to display a piece of information representing a predetermined threshold number of display times necessary for displaying the entire image within the frame on the screen size of the predetermined mobile terminal;

a shift indication step to cause the display position of the border line to shift on the image; an indication step to indicate a position on the image displayed on the display device;

a frame boundary correction step to receive the indication input to correct the position or the shape of the frame boundary indicated by the indication device and corrects the frame boundary according to the received indication input; and an editing step to update a piece of frame region information included in the information file with a frame boundary of the image in the page of the digital comic corrected by the frame boundary correction step according with the screen size of the predetermined mobile terminal.

* * * * *